United States Patent [19]

Morgan et al.

[11] Patent Number: 5,397,829

[45] Date of Patent: Mar. 14, 1995

[54] LOW-MELTING TETRAFLUOROETHYLENE COPOLYMER AND ITS USES

[75] Inventors: Richard A. Morgan, Vienna, W. Va.; William H. Tuminello, Newark; Mark E. Wagman, Wilmington, both of Del.

[73] Assignee: E. I. du Pont de Nemours and Company, Wilmington, Del.

[21] Appl. No.: 156,621

[22] Filed: Nov. 23, 1993

Related U.S. Application Data

[63] Continuation-in-part of Ser. No. 104,749, Aug. 11, 1993, abandoned, which is a continuation-in-part of Ser. No. 935,353, Aug. 28, 1992, Pat. No. 5,266,639.

[51] Int. Cl.⁶ .......................... C08K 5/02; C08K 5/03
[52] U.S. Cl. ................................. 524/463; 524/474; 524/484; 524/546
[58] Field of Search ............... 524/474, 484, 546, 463

[56] References Cited

U.S. PATENT DOCUMENTS

| | | | |
|---|---|---|---|
| 2,549,935 | 4/1951 | Sauer | 260/87.5 |
| 2,598,283 | 5/1952 | Miller | 18/55 |
| 2,946,763 | 7/1960 | Bro et al. | 260/45.5 |
| 3,013,967 | 12/1961 | Rulon-Miller et al. | 252/12 |
| 3,051,683 | 8/1962 | Mallouk | 260/45.5 |
| 3,062,793 | 11/1962 | Eleuterio | 260/37.5 |
| 3,125,547 | 3/1964 | Blatz | 260/45.5 |
| 3,132,124 | 5/1964 | Couture et al. | 260/87.7 |
| 3,196,194 | 7/1965 | Ely, Jr. et al. | 264/95 |
| 3,265,092 | 8/1966 | Ely, Jr. et al. | 138/118 |
| 3,461,129 | 8/1969 | Middleton | 260/307 |
| 3,769,252 | 10/1973 | Fujii et al. | 260/32.8 R |
| 3,904,575 | 9/1975 | Satokawa et al. | 260/32.8 R |
| 4,075,362 | 2/1978 | Concannon | 427/22 |
| 4,360,488 | 11/1982 | Barham et al. | 264/210.1 |
| 4,380,618 | 4/1983 | Khan et al. | 526/206 |
| 4,381,384 | 4/1983 | Khan | 526/206 |
| 4,626,587 | 12/1986 | Morgan et al. | 528/481 |
| 4,675,380 | 6/1987 | Buckmaster et al. | 528/481 |
| 4,742,122 | 5/1988 | Buckmaster et al. | 525/326.2 |
| 4,749,752 | 6/1988 | Youlu et al. | 525/199 |
| 4,789,717 | 12/1988 | Giannetti et al. | 526/209 |
| 4,864,006 | 9/1989 | Giannetti et al. | 526/209 |
| 4,902,456 | 2/1990 | Yen et al. | 264/41 |
| 4,904,735 | 2/1990 | Chapman, Jr. et al. | 525/199 |
| 5,087,680 | 2/1992 | Duan et al. | 526/254 |
| 5,106,911 | 4/1992 | Chapman, Jr. et al. | 525/199 |

FOREIGN PATENT DOCUMENTS

| | | | |
|---|---|---|---|
| 02-155907 | 6/1990 | Japan | C08F 214/26 |
| 9305100 | 3/1993 | WIPO | 524/546 |

OTHER PUBLICATIONS

Dissolution of Poly(tetrafluoroethylene) by Paul Smith and K. H. Gardner from Macromolecules, 1985, 18, 1222.

Primary Examiner—Joseph L. Schofer
Assistant Examiner—N. Sarofim
Attorney, Agent, or Firm—Edwin Tocker

[57] ABSTRACT

Copolymers of tetrafluoroethylene (TFE) and hexafluoropropylene (HFP) having high HFP content and end-of-melting temperature, $T_m$(end), as low as 200° C. are disclosed. Exceptional performance as a processing aid in polyolefins results from having $T_m$(end) of the TFE/HFP copolymer close to the processing temperature of the polyolefin. These TFE/HFP copolymers are soluble in fluorinated cyclic solvents. Copolymer/solvent systems copolymer at significant concentrations in selected solvents are fluid and stable at room temperature.

15 Claims, 4 Drawing Sheets

LOW-MELTING TETRAFLUOROETHYLENE COPOLYMER AND ITS USES

REFERENCE TO RELATED APPLICATION

This application is a continuation-in-part of Ser. No. 08/104,749, filed Aug. 11, 1993, now abandoned which is in turn a continuation-in-part of Ser. No. 07/935,353, filed Aug. 28, 1992, granted as U.S. Pat. No. 5,266,639, on Nov. 30, 1993.

FIELD OF THE INVENTION

This invention is in the field of partially-crystalline tetrafluoroethylene copolymers having unusually low crystalline melting temperatures, which makes them useful in solution form and as aids for the extrusion processing of polyolefins, including polyolefins incorporating antiblock agents.

BACKGROUND OF THE INVENTION

Homopolymers of TFE are crystalline or partially-crystalline fluoroplastics. Copolymerization with other monomers that introduce side groups into the polymer affects the properties of the polymers. Generally, at low levels of comonomer incorporation, both melting temperature $T_m$ and crystallinity decrease with increasing comonomer content. Crystallinity is reflected, for example, by the heat of fusion per unit mass as determined by differential scanning calorimetry (DSC). At high levels of comonomer incorporation, all detectable crystallinity may vanish. If the monomers and their concentrations are properly chosen, and molecular weight is properly controlled, useful fluoroelastomers or fluoroplastics may be obtained. For example, the TFE copolymer with perfluoro (methyl vinyl) ether (PMVE) in the approximate molar composition TFE/PMVE=70/30 is a well-known fluoroelastomer. On the other hand, copolymers of TFE with HFP or perfluoro (propyl vinyl) ether (PPVE) in the approximate molar compositions TFE/HFP=92/8 and TFE/PPVE=98.5/1.5 are well-known fluoroplastics. These particular perfluoroplastics have nominal $T_m$ of about 260° C. and 305° C., respectively, as judged by the peak of the melting endotherm by DSC. See FIG. 1. The minimum $T_m$(peak) for fluoroplastics in these compositional families recognized by ASTM standards is 250° C. for TFE/HFP polymers (ASTM D-2116) and 300° C. for TFE/PPVE polymers (ASTM D-3307). Such fluoroplastics have had commercial utility in part because of their relatively high $T_m$ and the mechanical properties that accompany the level of crystallinity associated with relatively low comonomer incorporation.

Partially-crystalline polymers are those which exhibit crystallinity under some conditions, as opposed to those polymers which are non-crystalline under all conditions. A partially-crystalline polymer typically exhibits crystallinity as polymerized, or after fabrication when the melted polymer is cooled slowly enough to permit development of molecular order. As is well-known, quenching from the melt can reduce or even preclude crystalline order in a specimen of a partially-crystalline polymer. The resultant quenched polymer is nevertheless considered partially crystalline because it started out, prior to melting and quenching, in this condition, and this condition is capable of being restored by reheating the polymer and cooling it more slowly. This effect is more likely for polymers with low crystallinity as polymerized. Crystallinity can be detected by several means, including differential scanning calorimetry (DSC).

There has been no interest in, and no commercial presence of, such fluoroplastics with comonomer concentration approaching but not reaching the level that completely eliminates crystallinity. The prior art does not exemplify TFE copolymers with perfluoroolefins having $T_m$ below or even near 200° C.

Certain copolymers of tetrafluoroethylene (TFE) and hexafluoropropylene (HFP) are known. Bro & Sandt in U.S. Pat. No. 2,946,763 disclose TFE/HFP copolymers with HFP content reflected by a specific infrared ratio, herein called HFP index or HFPI, in the range 1.5 to 6. They use a multiplier of 4.5 to convert HFPI to HFP content in wt %. Bro & Sandt teach that HFPI greater than 6 is extremely difficult to achieve. An HFPI of 4.70 is the highest value exemplified.

Couture et al in U.S. Pat. No. 3,132,124 teach process refinements to make TFE/HFP copolymers with HFPI in the range of 1.5 to 6. An HFPI of 4.0 is the maximum value exemplified.

There are frequent references in the literature to TFE/HFP copolymers having HFP content of from 6.75 to 27 wt %, apparently following the disclosure of the 1.5 to 6 HFPI range and 4.5 multiplier by Bro & Sandt.

Khan & Morgan in U.S. Pat. No. 4,380,618 disclose a process for synthesis of TFE polymers including TFE/HFP and other TFE copolymers. They teach that perfluoroolefin incorporation into TFE copolymers can be up to about 15 mol %. Khan & Morgan use a multiplier of 2.1 to convert HFPI into HFP content in mol %, so that 15 mol % corresponds to an HFPI of 7.14. The preferred compositional range is 6 to 9 mol % (HFPI of 2.86 to 4.29). For the only example of a TFE/HFP polymerization, HFP content in the polymer was 8.54 mol %, corresponding to an HFPI of 4.07.

Concannon in U.S. Pat. No. 4,075,362 refers to TFE/HFP copolymers having up to 95 wt % HFP. Concannon cites only U.S. Pat. No. 2,946,763 as a teaching of a method of making such copolymers. As discussed above, U.S. Pat. No. 2,946,763 teaches that it is extremely difficult to prepare TFE/HFP copolymers having HFPI greater than 6. Consistent with this teaching of extreme difficulty, the highest HFP content of any of the copolymers actually exemplified by Concannon is 25 wt %, corresponding to an HFPI of 5.56 according to the conversion factor of Bro & Sandt.

Fujii et al in U.S. Pat. No. 3,769,252 and Satokawa et al in U.S. Pat. No. 3,904,575 also refer to TFE/HFP copolymers having up to 95 wt % HFP but likewise cite only U.S. Pat, No. 2,946,763 for a teaching of a method of making such copolymers. Therefore, one skilled in the art would not expect the single exemplified TFE/HFP copolymer to have HFPI greater than 6.

Khan in U.S. Pat. No. 4,381,384 discloses a continuous polymerization process for TFE polymers including copolymers containing up to 20 mol % of comonomer. For TFE/HFP copolymers, a multiplier of 2.1 was used to convert HFPI to HFP content in mol %, so that the limit of 20 mol % would correspond to an HFPI of 9.5. In the examples for TFE/HFP copolymers, HFP content of 5.4 mol % (HFPI of 2.57) was the highest level actually achieved.

Youlu et al in U.S. Pat. Nos. 4,749,752 and 5,087,680 describe TFE/HFP copolymers having melt viscosity in excess of $10^5$ Pa.s and HFP content in the range 12–30 wt %. Although U.S. Pat. No. 5,087,680 claims a TFE/HFP copolymer with HFP content of 12–30 wt %, the main teaching is directed to extra-high-molecular-weight polymer, and the copolymer of the only polymerization example had 14.5 wt % HFP determined by an undisclosed method. The prior-art citation from which one might judge the method of measuring HFP content was to foreign equivalents of U.S. Pat. No. 3,051,683 which discusses the infrared method taught in U.S. Pat. No. 2,946,763, according to which the copolymer having 14.5 wt % HFP exemplified in U.S. Pat. No. 5,087,680 would have an HFPI of 3.22. No preferred range for HFP content is stated.

The continuous process of Khan in U.S. Pat. No. 4,381,384 suffers from some disadvantages, including a very high surfactant concentration that must be used to approach stable reactor operation and to enable discharge of the reaction mass without coagulation of the polymer in or in passing through the let-down valve. This high surfactant concentration has adverse economic effect, can make it extremely difficult to isolate the polymer from the dispersion, and can be undesirable in the isolated product.

Khan & Morgan in U.S. Pat. No. 4,380,618 suggest that HFP content in a TFE/HFP copolymer can range up to a level corresponding to an HFPI of 7, approximately, but there is no example of this HFPI level having been actually achieved, nor is there an example of a copolymer having an HFPI of 6, the upper limit taught by Bro & Sandt in U.S. Pat. No. 2,946,763. An obstacle to the achievement of high HFP content in this copolymer is the low reactivity of HFP relative to that of TFE. Khan & Morgan state that higher temperatures may be employed to promote polymerization rate. Couture et al in U.S. Pat. No. 3,132,124 teach that increasing polymerization temperature is beneficial to rate up to about 119° C. However, the advantage to be gained from higher temperatures is limited. A specific problem with high-temperature polymerization of low-melting polymer is partial melting of the polymer during the process. This can result, at least, in coating of the reactor wall. A buildup of skin may adversely affect heat transfer, and skin can slough off as undesirable large pieces of polymer.

Khan & Morgan further state that higher pressures may also be used to promote polymerization rate, especially if a comonomer is unreactive relative to TFE. However, this is not always possible, for reasons of safety or equipment design limitations, for example. In Example 1 of Khan & Morgan, HFP partial pressure was 62–70% of total pressure.

Fluoropolymers are known to be useful as processing aids when used in low concentration in other polymers to mitigate effects such as melt fracture or high torque that limit rate of extrusion of these host polymers, thereby improving processability. Polyolefins are a class of host polymers of particular interest.

Blatz in U.S. Pat. No. 3,125,547 teaches the use of fluoropolymers in polyolefins to facilitate extrusion. A general requirement taught by Blatz is that the fluoropolymer must be molten or fluid at the processing temperature $T_p$ of the polyolefin. Blatz exemplifies fluoroelastomers, which are non-crystalline and for which the glass transition temperature $T_g$ is well below $T_p$, and, therefore, are fluid at $T_p$. Blatz also exemplifies tetrafluoroethylene (TFE) homopolymer which melts 55° C. below $T_p$. There is no teaching about how such fluoropolymers perform when an antiblock agent is present in the host polymer.

Various two-component process aids have been identified in attempts to achieve better performance than that provided by the single component of Blatz. For example, Chapman & Priester in U.S. Pat. No. 4,904,735 teach a synergistic combination of solid and fluid fluoropolymers, e.g., a fluoroelastomer and an unmelted fluoroplastic, to achieve enhanced process aid performance. That invention is said to be applicable to hydrocarbon polymers containing antiblocking agents, but no data are presented. As a further example, Chapman & Priester in U.S. Pat. No. 5,106,911 teach a combination of fluoroelastomer and molten polyvinylidene fluoride fluoroplastic as a processing aid. As shown by Example 1, the average reduction in extrusion pressure achieved by this process aid system was about 14% in the absence of an antiblock agent. Polyvinylidene fluoride contains 3 wt % hydrogen.

A general problem with prior art processing aids is that the benefit of the aid is substantially reduced when an antiblock agent such as silica or talc is added to the polyolefin.

Middleton in U.S. Pat. No. 3,461,129 discloses a solution of a low-melting (83°–145° C.) TFE homopolymer in a fluorinated oxazoline compound. The melting point range cited indicates a very low molecular weight compound and not a high molecular weight polymer.

Barham in U.S. Pat. No. 4,360,488 discloses a process for forming shaped articles from a gel of TFE homopolymer or non-melt-fabricable TFE polymer modified with a low concentration of comonomer. In this process, the polymer is swollen or dissolved in highly fluorinated solvents near the melting point of the polymer, and a working gel forms when the mass is cooled to room temperature. Several perfluorinated cycloalkanes are stated to be suitable solvents for this process.

Yen and Lopatin in U.S. Pat. No. 4,902,456 disclose a process for making a membrane that involves a melt blend of a TFE/HFP copolymer and a chlorotrifluoroethylene oligomer solvent. The melt blends are made at 280°–310° C. and form gels upon cooling, with solvent separation under some circumstances. No prior method of making such microporous membranes by conventional solution immersion casting processes was known because of the inert nature of prior-art TFE/HFP copolymers.

Smith & Gardner [Macromolecules 18, 1222 (1985)]review and discuss dissolution of polytetrafluoroethylene (PTFE). They report that PTFE had been dissolved only in perfluorinated alkanes. In summary discussion, Smith & Gardner point out that many polymers analogous to PTFE and TFE copolymers, i.e., non-hydrogen-bonding polymers, dissolve only just below their melting points.

There are no known disclosures of solutions of melt-processible TFE/HFP copolymers of melt viscosity in the range $0.1 \times 10^3$ to $10 \times 10^3$ Pa.s. In particular, there are no known disclosures of such copolymer/solvent systems that are stable and fluid at room temperature.

Thin fluoropolymer films are potentially useful in many ways to provide a surface with fluoropolymer properties on substrates with different properties. Such films or coatings might serve various release (non-stick), frictional, dielectric, protective, or even melt adhesive purposes. One particularly demanding use for such films would be in protecting magnetic data storage media, for which a carbon protective coat and a fluorinated polyether lubricant are now used. This use would take advantage of the inherent properties of a fluoropolymer and could increase the storage density of a magnetic disk, which varies inversely with the square of the distance between the reading head and disk, if the coating could be made thin enough. To be successful, the polymer film would need to be of the order of 10-300 angstroms in thickness.

SUMMARY OF THE INVENTION

It has been discovered that TFE/HFP copolymers having HFPI within a specifically selected range exhibit surprising utility as processing aids in polyolefins and as solutions in highly-fluorinated solvents. These copolymers have low crystalline melting temperature $T_m$ due to unusually high HFP content. The unexpected benefit of these TFE/HFP copolymers as processing aids is attributed to the fact that, because of low $T_m$, $T_m$ can be brought into register with common processing temperatures $T_p$ for polyolefins. Solutions of these copolymers are fluid at significant concentrations at modest temperatures, including room temperature for selected copolymer/solvent systems, surprisingly so because $T_m$ is so high above room temperature. The availability of solutions at modest temperatures enables TFE/HFP copolymers to be used in ways either not previously possible or at least inconvenient.

Specifically, this invention provides a TFE/HFP copolymer having an HFPI of 6.4 to about 9. Preferred for reasons of utility and/or ease of synthesis are those copolymers having HFPI in the range of about 7.3 to 9.0, and most preferably from 7.3 to 8.5. The invention also provides solutions of the copolymer in highly fluorinated solvents. Preferred solutions are based on solvents that permit dissolution of the TFE/HFP copolymer at atmospheric pressure and provide stable solutions at room temperature.

This invention also provides the use of the TFE/HFP copolymer, as well as other highly fluorinated polymers with similar melting points, as processing aids in polyolefins. It offers substantial benefit in the absence of antiblock agents and very little restriction in performance in the presence of antiblock agents. The highly-fluorinated polymers are partially-crystalline (as hereinbefore described) fluoroplastics with end of melting temperature $T_m$(end) in the range 180°-255° C., and preferably in the range 180°-235° C. When used as processing aids in polyolefins, copolymers are preferably chosen to have $T_m$(end) values close to the processing temperature $T_p$ of the polyolefin. This range is from 40° C. below $T_p$ to 25° C. above $T_p$, preferably from 30° C. below to 15° C. above $T_p$, and most preferably from 20° C. below $T_p$ to 5° C. above $T_p$. Copolymers of TFE and HFP are preferred.

The invention also provides coatings of the TFE/HFP copolymer of the invention, and coated articles. When formed from solution, coatings can be dense low-surface-energy films with thicknesses ranging down to 100 angstroms.

Figure 3:
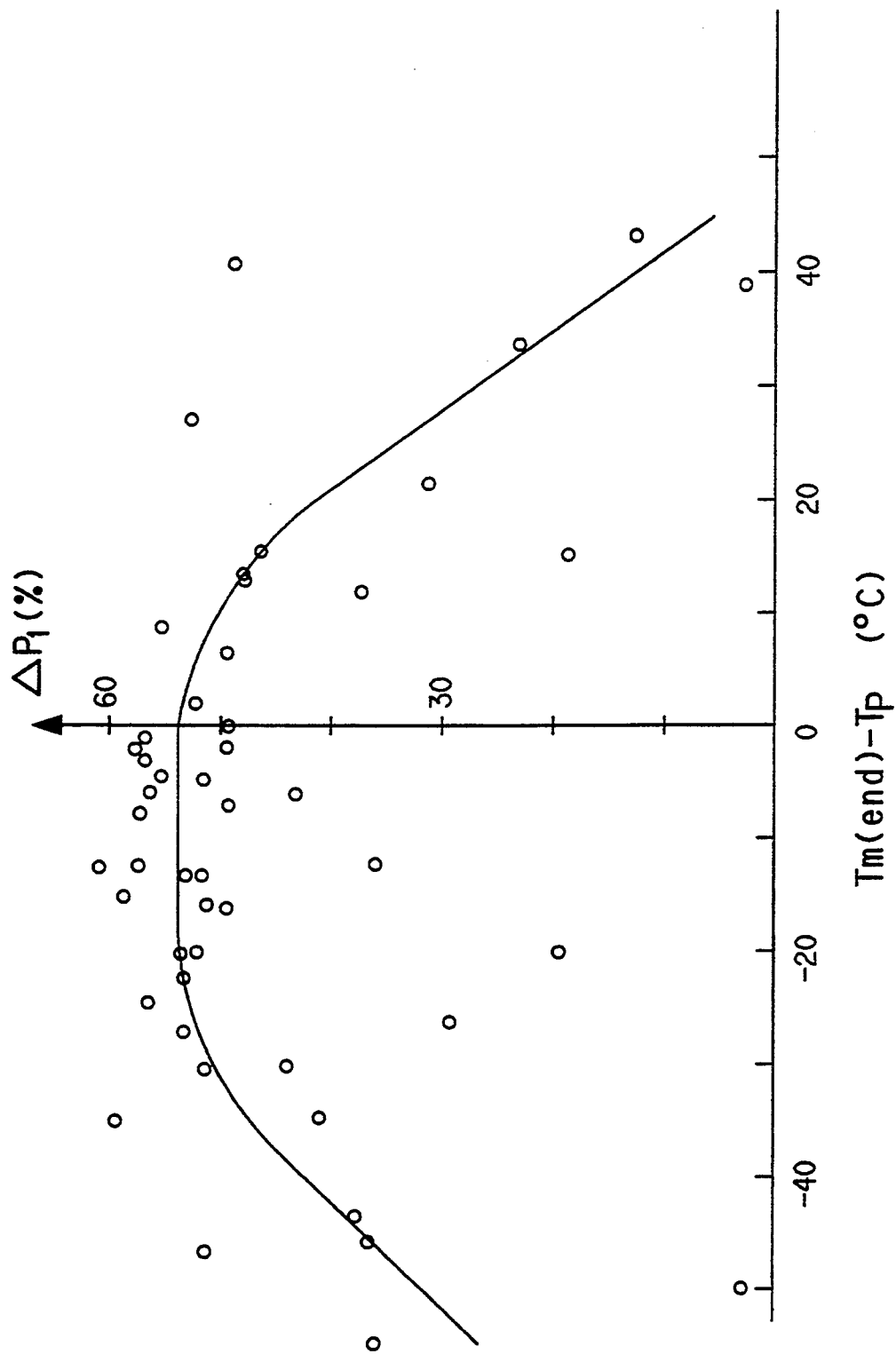
FIG. 3 is a plot of the reduction in extrusion pressure of polyethylene without antiblock agent resulting from the use of TFE/HFP copolymers of this invention as processing aids in the polyethylene, vs. the difference between $T_m$(end) and $T_p$.
Figure 4:
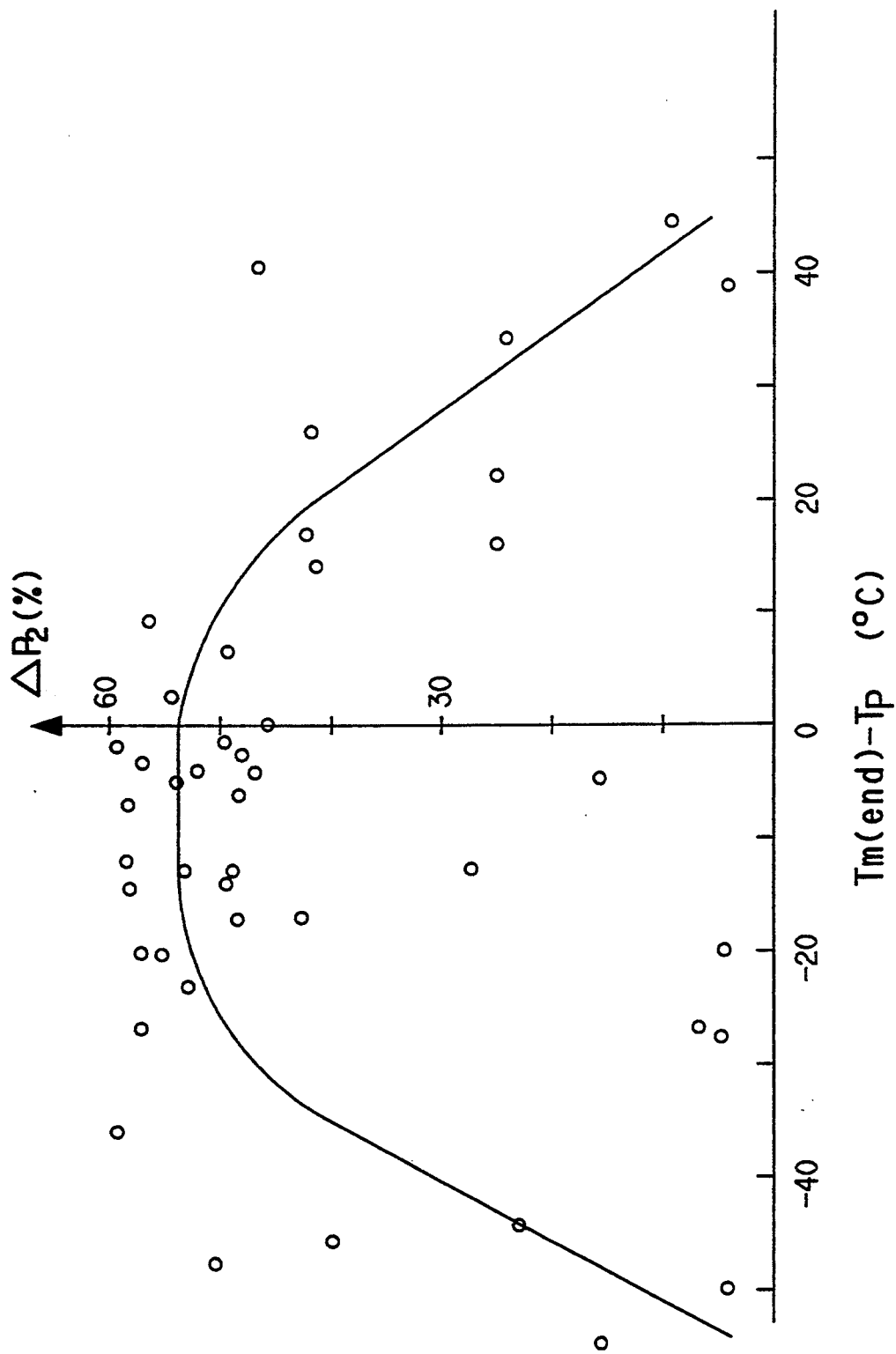
FIG. 4 is a plot of the reduction in extrusion pressure of polyethylene containing an antiblock agent resulting from the use of TFE/HFP copolymers of this invention as processing aids in the polyethylene, vs. the difference between $T_m$(end) and $T_p$.

The lines in FIGS. 3 and 4 represent the conclusions drawn from the data in the figures, and are not the result of a mathematical fit to the data.

DETAILED DESCRIPTION OF THE INVENTION

TFE/HFP copolymers with low melting temperature $T_m$ due to high HFP content have now been made by careful adjustment and control of several parameters in a semi-batch dispersion (sometimes designated emulsion) polymerization process. These parameters include:

1) Extremely high HFP partial pressures in the range 83-95% of total monomer pressure.

2) Maintenance of the desired ratio of TFE and HFP monomers throughout the batch by careful balancing of polymer formation and initiator solution addition against consumption of HFP monomer to keep the partial pressure of HFP constant.

3) Use of a surfactant type and amount that promotes the formation of numerous very small dispersion particles and thus a high surface area for polymerization.

4) A dwell period of 10-30 min after full pressurization of the reactor, during which time no TFE is added beyond the precharged amount, to overcome a tendency to form TFE-rich copolymer early in the batch.

5) Reaction temperature as high as possible consistent with the problems or limitations recited above.

The TFE/HFP copolymers of this invention have HFPI in the range 6.4 to about 9. The HFPI range of about 7.3 to 9.0 is preferred, and the range 7.3 to 8.5 is most preferred. These copolymers can have melt viscosity (MV) in the range of about $0.1 \times 10^3$ to about $10 \times 10^3$ Pa.s, preferably $0.5 \times 10^3$ to $5 \times 10^3$ Pa.s.

The polymers of this invention may be made at least by the method known as dispersion (or emulsion) polymerization, and dispersion (or emulsion) polymerization in the presence of a solvent.

The minimum HFP partial pressure that can be used to make the TFE/HFP copolymer of this invention by the present semi-batch process is about 500 psig (3.4 MPa) out of 600 psig (4.1 MPa) total monomer pressure. HFP partial pressure is preferably about 525 psig (3.6 MPa), most preferably about 550 psig (3.8 MPa) out of 600 psig total monomer pressure. Higher, or slightly lower, total monomer pressure may be used, in which case HFP partial pressure should be adjusted proportionately.

The surfactant should be chosen to obtain high dispersion particle surface area (small particle size) in order to enhance reaction rate which is suppressed by the high concentration of HFP relative to TFE. The quantity required to achieve this objective will vary with the composition of the surfactant. A high concentration of surfactant can impede isolation of the TFE/HFP copolymer resin from the dispersion by some techniques. The concentration of surfactant should be less than 0.4 wt%, preferably less than 0.2 wt %, based on the aqueous medium. Suitable surfactants include ammonium perfluorononanoate, and the perfluoroalkyl ethane sulfonic acids and salts thereof disclosed in U.S. Pat. No. 4,380,618. Of these, the mixture of $C_6$–$C_{16}$ perfluoroalkyl ethane sulfonic acids sold as Zonyl® TBS fluorochemical surfactant (Du Pont Company) is preferred.

Temperatures in the range of about 103°–108° C. are suitable for making the TFE/HFP copolymers of this invention by the semibatch process used. In addition to the limitations of high-temperature polymerization outlined in the background section, surfactants used in emulsion polymerization appear to be less effective at temperatures above 103°–108° C. and there is a tendency to lose dispersion stability.

Initiators commonly employed in emulsion polymerization of TFE copolymers are water-soluble free-radical initiators such as ammonium persulfate (APS), potassium persulfate (KPS), or disuccinic acid peroxide. APS and/or KPS is preferred.

After the reactor is charged with water, surfactant and monomers, heated to the chosen temperature, and agitation is started, a solution of initiator is added at a prescribed rate to initiate polymerization. It is preferred that pressure is allowed to drop as polymerization starts, and no TFE is added for a prescribed time, during which the initiator solution is continuously added. Then, TFE addition is started and controlled according to the scheme chosen to regulate the polymerization. It is possible to make a TFE/HFP copolymer with high HFP content without this dwell period, but the dwell period reduces the high-melting tail of the DSC trace, resulting in a narrower range of melting.

There are several alternatives for regulating the rate of FEP polymerization. It is common with most alternatives first to precharge all HFP monomer and then to add TFE to the desired total pressure. Additional TFE is then added after initiator injection and reaction kick-off to maintain the chosen pressure. The TFE may be added at a constant rate, with agitator speed changed as necessary to increase or decrease actual polymerization rate and thus to maintain constant total pressure. Alternatively, the total pressure and the agitator speed may both be held constant, with TFE added as necessary to maintain the constant pressure. A third alternative is to carry out the polymerization in stages with variable agitator speed, but with steadily increasing TFE feed rates. The latter two alternatives provide the most homogeneous product and are preferred.

The HFP monomer is much less reactive than the TFE monomer so that the HFP/TFE ratio must be kept high to assure a high incorporation of HFP. The polymerization kinetics under steady-state conditions also requires a constant ratio of the monomers throughout the polymerization in order to obtain a homogenous copolymer, one with randomly distributed monomer units. Failure to do so will result in a broad HFP distribution and the resin will have a broad melting range. Since the TFE is much more reactive than HFP, careful maintenance of a constant HFP/TFE ratio is needed.

One or more additional comonomer other than TFE and HFP can be incorporated into the copolymer by either pre-charge, pre-charge plus subsequent addition (pumping), or pumping of the additional comonomer into the reactor, depending on the reactivity of the comonomer and the amount to be incorporated into the copolymer. Examples of such additional comonomers are the fluoromonomers, including fluoroolefins having 2 to 8 carbon atoms and being other than TFE and HFP, examples of which are perfluorobutyl ethylene, vinylidene fluoride, chlorotrifluoroethylene, and perfluoroolefins having from 4 to 8 carbon atoms. Additional examples of such fluoromonomers include perfluoro(alkyl vinyl) ethers having the formula $CF_2$=$CFO(R'_fO)_kR_f$, wherein k is 0–5, $R'_f$ is linear or branched perfluoroalkylene of 2 to 6 carbon atoms, and $R_f$ is perfluoroalkyl of 1 to 6 carbon atoms, examples of which are perfluoro(methyl vinyl) ether and perfluoro(propyl vinyl) ether. Still additional examples of such fluoromonomer includes the functional fluorovinyl ethers, wherein the functionality is ester, alcohol, or acid. The ester-functional fluorovinyl ethers can be carboxylic ester or alcoholic ester. Examples of such fluorovinyl ethers include $CF_2$=$CF[OCF_2CF(CF_3)]_m$—O—$(CF_2)_nCH_2OH$ as disclosed in U.S. Pat. No. 4,982,009 and the alcoholic ester $CF_2$=$CF[OCF_2CF(CF_3)]_m$—O—$(CF_2)_n$—O—COR derived therefrom by reaction of the alcohol with pyridine,N,N-dimethylaminopyridine, and acetyl chloride in methylene chloride at atmospheric pressure and temperature of 5°–15° C. Additional fluorovinyl ethers include $CF_2$=$CF[OCF_2CF(CF_3)]_mO(CF_2)_nCOOH$ and its carboxylic ester $CF_2$=$CF[OCF_2CF(CF_3)]_mO(CF_2)_nCOOR$ disclosed in U.S. Pat. No. 4,138,426. In these formulae, m=0 to 3, n=1 to 4, and R is methyl or ethyl. Preferred such fluorovinyl ethers are $CF_2$=$CF_2OCF_2CF(CF_3)O(CF_2)_2CH_2OH$ and $CF_2$=$CF_2OCF_2CF(CF_3)O(CF_2)_2COOH$. These fluoromonomers are preferred either because of their availability or their ability to incorporate functionality into the resultant copolymer. The amount of additional comonomers that can be incorporated into the TFE/HFP copolymer will depend on the modification to the TFE/HFP copolymer desired, so long as the HFPI range of 6.4 to about 9 is observed and the copolymer containing the additional comonomer is still partially crystalline. The additional comonomer does not prevent the incorporation of the high amount of HFP into the comonomer. Typically from 0.1 to 10% of additional comonomer may be present, based on the weight of the resultant copolymer. The uses of TFE/HFP copolymer disclosed herein include the possibility of the copolymer containing one or more additional comonomers such as described above.

After polymerization and discharge of the copolymer dispersion from the reactor, the polymer may be isolated from the aqueous medium by one of the means well known in the art. One method is to stir vigorously until the polymer separates out as a non-water-wet powder which floats on the water and can be collected on a filter or decanted from the water. An electrolyte such as ammonium carbonate or nitric acid can be added to the dispersion to facilitate coagulation by the vigorous stirring. The polymer can be dried as collected or pressed to remove a portion of the water before drying. Another method is to stir the dispersion only until it thickens into a water-wet gel and then collect the polymer on a filter. The filtered polymer can be dried directly or can be washed with water or organic solvents such a methanol or acetone before drying. Pressing is not necessary because polymer collected in this manner is less prone to hold water droplets. Another method of isolation is spray-drying of the dispersion or the water-wet gel. Still another method of polymer isolation that can be used is the technique known as solvent-aided pelletization. In this method, the dispersion is first gelled either mechanically or chemically by the addition of an electrolyte such as ammonium carbonate or nitric acid. The gel is then broken by addition of a water-immiscible organic solvent with low surface tension, preferably not more than 35 dyne/cm, accompanied by agitation. Suitable solvents include hydrocarbon, halocarbon, and hydrohalocarbon liquids. If an agglomerating isolation technique is used, the temperature of the isolating process may influence the size or the friability of the resultant agglomerates.

Isolated wet polymer can be dried by any method suitable for drying finely divided solids. Air flow through the drying chamber should be consistent with the desire or any requirement to avoid blowing the powder about. The drying technique, temperature, and time chosen should be consistent with intended use of the dried polymer. If the polymer is to be used as a finely-divided powder, compaction of the powder mass and particle-to-particle fusion must be avoided. Since the TFE/HFP copolymers of this invention melt at unusually low temperatures, the drying temperature likewise must be low to obtain a free-flowing, finely-divided powder.

If the polymer is not to be used as a powder, higher drying temperatures can be used. If appropriate, conventional thermoplastic finishing techniques including extrusion formation of cubes or pellets can be used.

If stabilization of the TFE/HFP copolymer is required, one of several known techniques can be employed. These include, for example, the humid heat treatment of Schreyer (U.S. Pat. No. 3,085,083), the extrusion-finishing of Morgan & Sloan (U.S. Pat. No. 4,626,587), the chemical treatments of Bekiarian et al (U.S. Pat. No. 4,946,902) and Buckmaster (U.S. Pat. No. 5,045,605), and treatment with elemental fluorine. Some of these techniques would result in fusion of the polymer particles. The fused polymer can, of course, be ground if it is desired to have stabilized polymer in finely divided form. Treatment of polymer powder isolated and dried as described above with fluorine can reduce the number of unstable end groups, if their presence will be detrimental to the end use application, without destroying polymerization particle identity. The fluorination may be carried out with a variety of fluorine radical generating compounds, but the polymer preferably is contacted with fluorine gas. Since reactions with fluorine are very exothermic, it is preferred to dilute the fluorine with an inert gas such as nitrogen. Suitable conditions for fluorine treatment are those discussed by Buckmaster & Morgan in U.S. Pat. No. 4,675,380, except that temperature should be between 0° C. and the temperature at which the polymer particles begin to melt or fuse together if freely-flowing powder is desired. This temperature may be as much as 50°–60° C. below the peak melting temperature of the resin.

The TFE/HFP copolymers of this invention may have uses in dispersion form. In that case, the as-polymerized (raw) dispersion may be used as discharged from the reactor if it has adequate stability for the intended purpose. Alternatively, the raw dispersion can be stabilized by addition of surfactants, or concentrated and stabilized by techniques well known in the art.

The TFE/HFP copolymers of this invention can be in solution in highly fluorinated solvents. Because of their composition, they are unusually easy to dissolve and can provide stable, fluid copolymer/solvent systems at ambient temperature. Perfluorinated compounds are preferred as solvents, but fluorinated compounds having up to about 12.5 atomic percent (at %) hydrogen and/or about 37.5 at % chlorine can be used. Compounds most useful as solvents are highly fluorinated cycloalkanes or aromatics, both of which may contain fused or unfused rings. Highly fluorinated cycloalkanes are preferred. Both types of compounds may be substituted by perfluoroalkyl or perfluoroalkylene groups. For dissolution at atmospheric pressure, solvents with boiling points of about 140° C. or greater are required. Under autogenous pressure, solvents with boiling points of about 70° C. or greater are required. Compounds useful as solvents include, but are not limited to, perfluorodecalin, perfluoro(1-methyldecalin), perfluoro(dimethyldecalin), perfluoro(tetradecahydrophenanthrene), perfluoronaphthalene, perfluoromethylcyclohexane, perfluorobiphenyl, perfluoro(cyclohexylmethyl)decalin, and higher boiling adducts. Certain nitrogen-containing solvents such as perfluoro(triamylamine) may also be used. Preferred solvents are perfluorodecalin and perfluoro(tetradecahydrophenanthrene).

Solutions can be prepared in a broad range of solvents at elevated temperature and under pressure. Solutions can be prepared at elevated temperature and at atmospheric pressure for a selected range of solvents with relatively high boiling points (BP). The temperature required for dissolution of the TFE/HFP copolymers varies with the solvent and the composition of the copolymer. For example, perfluorobenzene (BP=80° C.) readily dissolves a TFE/HFP copolymer of this invention under autogenous pressure at 85°–90° C., but would not dissolve the polymer at atmospheric pressure. Perfluoro(tetradecahydrophenanthrene) (BP=215° C.) dissolves the same copolymer at about 115° C. under autogenous pressure, but also can be used to prepare solutions at atmospheric pressure.

Solutions having concentrations of the TFE/HFP copolymer of this invention of as little as 0.1 wt % and as much as 10% and higher, 20% and 30% by weight, for example, can be made. Lower concentrations in the 0.1 or 0.5 to 10 and 0.1 or 0.5 to 5 and 0.5 to 2.5 wt % ranges are preferred for many purposes. Solution viscosity, of course, increases with polymer concentration. Solutions in selected solvents with polymer concentration in excess of about 2.5 wt % form gels when quiescently cooled to room temperature. Solutions at about 2.5 wt % and lower concentration in selected solvents form low-viscosity stable copolymer/solvent systems at room temperature. The exact nature of these fluid systems at or near room temperature is not known with certainty. They may be solutions, though sometimes subtle changes in optical properties may occur upon cooling. However, they may be microgels or colloidal dispersions. A copolymer/solvent system is considered to be stable if centrifuging does not substantially change the copolymer concentration in the solvent. This might occur even for a suspension, for example, if solvent and suspended particles had the same densities. The maximum concentration at which the system remains stable and fluid when quiescently cooled to room temperature in a particular solvent varies slightly with the composition of the TFE/HFP copolymer. Some solutions that form gels when quiescently cooled to room temperature can be kept fluid by shearing (stirring) while cooling. These latter systems may thicken with time, but remain pourable, and can be thinned again by restirring. The designation "copolymer/solvent system" is herein adopted to describe all of the fluid, stable systems of uncertain nature at and near room temperature. Solutions in certain other solvents precipitate and form low-viscosity suspensions when cooled to room temperature, and are useful as such. Selected copolymer/solvent systems with copolymer concentrations up to about 2.5 wt % are easily sprayable at room temperature. Suspensions are sprayable at higher concentrations. The concentration of the copolymer in suspension can be at least 0.1 wt %, with the preferred compositions having the same copolymer concentrations as for the solutions. The concentrations of copolymer in the copolymer/solvent system will generally be about 0.1 to 10 wt %, and typically about 0.1 or 0.5 to 5 wt % or about 0.5 to 2.5 wt %.

All of these states of the copolymer associated with the solvent, if not already solutions at room temperature (20° C.), can be returned to the solution state by heating of the system, preferably accompanied by stirring, and, if necessary, maintaining the resultant solution at an elevated temperature. Upon standing at room temperature, a small amount of solid material, possibly undissolved copolymer (may result from inadequate dissolving procedure) or contaminant might be discerned at the bottom of the solution. The same may be true for a suspension caused by some settling of the suspension to leave a top layer of solution. Thus, solution can be present along with settled solids and along with suspension. Agitation of these liquid media will redisperse the settled solids or suspension, as the case may be. Alternatively, these media can be subjected to filtration to remove all discernible solids, whereby solution will remain.

The TFE/HFP copolymers of this invention can be used in many ways. One use for which the melting temperature range of these selected TFE/HFP copolymers makes them surprisingly superior is as a processing aid in polyolefins. This aspect of the invention is discussed in detail below. The TFE/HFP copolymer resins can be used in powder or pellet form in any of the processes such as extrusion, molding, or pressing by which thermoplastics are conventionally fabricated into finished articles, providing the properties of the copolymer are suitable for the intended use. Such articles include filaments, film or sheet, tubing, hose, wire insulation, foamed structures including wire insulation, coatings on wire for mechanical uses, injection-molded items, blow-molded articles, bottles, containers, laboratory ware, protective linings, laminates and other composite structures, and the like. Certain of these articles, especially those with relatively small dimensions in at least one direction such as tubing or film or bottles and made using rapid cooling from the molten state can have essentially no crystalline order, as discussed above. As a consequence, they can be transparent and substantially free from haze. Some laminates are essentially coated articles. The unique low-melting characteristics make the TFE/HFP copolymers of this invention suitable for uses not accessible to prior-art perfluoroplastics because properties were inappropriate or because required processing temperatures were too high. For example, a TFE/HFP copolymer of this invention can be used as a melt adhesive at moderate temperature. High processing temperatures of prior-art perfluoroplastics disqualified them for use in conjunction with many other materials which could not tolerate exposure to those temperatures.

In aqueous dispersion form, the TFE/HFP copolymers of this invention can be used according to any of the conventional techniques for using fluoropolymer dispersions, including coating, casting, and impregnation. Normally, after the copolymer dispersion particles are deposited in place in the wet state, the deposit is dried and the particles are fused thermally. Other materials can be blended into the TFE/HFP copolymer dispersions for these uses, or such blends can be co-coagulated as a step toward dry blends or filled resins.

The TFE/HFP copolymer solutions, suspensions, and copolymer/solvent systems of this invention can be used in many ways, making it possible to achieve end results that could not be achieved with previously available perfluoropolymers or could be achieved only in less convenient ways. These results include any of the results for which polymer solutions are used, such as coating, encapsulation, impregnation, and the casting of film. The TFE/HFP copolymer solutions, suspensions, and copolymer/solvent systems of the invention can be employed in any of the methods by which solutions are known to be used, including dipping, painting, and spraying.

The TFE/HFP copolymer solutions, suspensions and copolymer/solvent systems of this invention can be used to make coatings on a broad range of substrate materials, including metal, semiconductor, glass, carbon or graphite, and natural and synthetic polymers. The substrates can be in a broad range of physical forms, including film or paper, foil, sheet, slab, coupon, wafer, wire, fiber, filament, cylinder, sphere, and other geometrical shapes, as well as in a virtually unlimited number of irregular shapes. Coatings can be applied by methods known in the art, including dipping, spraying, and painting. For plane substrates of suitable dimensions, spin coating can be employed. Porous substrates can also be coated or impregnated. These include, for example, screens, foams, microporous membranes, and woven and non-woven fabrics. In making such coatings, the solvent can be driven off by heat leaving a dry, TFE/HFP copolymer coating. One advantage of selected solutions or copolymer/solvent systems over aqueous dispersions for coating purposes is that coatings can be achieved below the melting temperature of the TFE/HFP copolymer. Another advantage is that extremely thin coatings can be achieved, as thin as 100 angstroms or possibly even thinner depending on the coating characteristics required.

The TFE/HFP copolymer gels of this invention can be used to apply the copolymer to a site where it would be disadvantageous to use a low viscosity solution, suspension, or copolymer/solvent system.

Coatings of the TFE/HFP copolymers of this invention can be a sole coating on a substrate, or a component of a multilayer coating. For example, a TFE/HFP copolymer coating of this invention can be used as a first or primer, intermediate, or final coating in a multilayer fluoropolymer coating system. The coatings of this invention include coatings resulting from several successive applications of solution, suspension, or copolymer/solvent systems to increase coating thickness to desired levels.

Coatings of this invention can consist of the TFE/HFP copolymers of this invention alone, or of the TFE/HFP copolymers admixed with minor amounts of other materials either soluble in the solvent or dispersed in the coating solution, suspension, or copolymer/solvent system. A minor amount can be up to about 10 wt % based on the combined weight of TFE/HFP copolymer and additive.

Solutions can also be used to make microporous membranes from the selected TFE/HFP copolymers of this invention by conventional solution immersion casting methods.

Specific coated articles are within the scope of this invention.

Coated articles include polymer extrusion dies and molds for rubber and plastic parts, such as o-rings, bottle caps, golf balls, golf ball covers, golf ball cover half shells, and the like. The TFE/HFP copolymers of this invention both as-polymerized and after fluorine treatment can be used in coatings. In the case of dies used for extrusion of polyolefins, it is preferred that coatings be made from as-polymerized resin because such coatings are more durable. Both interior and exterior surfaces of extrusion dies may be coated to, respectively, facilitate extrusion and alleviate die buildup.

Coated articles include gasoline engine carburetor parts; internal parts of internal combustion engines such as valves and piston skirts; razor blades; metal containers such as cans, pans, trays, vessels, and the like; metal sheets and foils; continuous metal belts; metal rods, tubes, bars, profiles, and the like; bolts, nuts, screws, and other fasteners.

Coated articles include an article bearing a machine-readable marking on at least one surface, especially but not limited to a tag that can be attached to another object to provide information about inventory identification, contents, ownership, hazards, operating conditions, or maintenance requirements, for example.

Coated articles include wire for electrical and mechanical service. In either case, the metal wire may be solid or stranded. Wires for mechanical service include catheter guide wire and the actuating wire of push-pull cable.

Coated articles include rubber o-rings, seals, beading, gasketing, and the like.

Coated articles include paper and textile materials, including woven fabric including glass fabric, non-woven fabric, felts, and the like, fibers including filaments, yarns, e.g. staple and continuous filament, and strands.

Coated articles include foams, membranes, and the like.

Coated articles include optical fibers in which the substrate is a glass or plastic fiber.

Coated articles include semiconductors, semiconductor devices, magnetic storage media including disks, photoconductors, electronic assemblies, and the like, wherein the coating thickness may be as little as 200 angstroms or even as little as 100 angstroms or even as little as 50 angstroms. Use of solutions containing low concentrations of the TFE/HFP copolymer of this invention, e.g. as low as 0.001 wt % copolymer can be especially advantageous to form these very thin coatings.

A coating of a composition comprising the TFE/HFP copolymer of this invention can be used as a melt adhesive to bond two articles together. The coating may be applied to a substrate from solution, suspension, or stable copolymer/solvent system in a highly fluorinated solvent, from aqueous dispersion, or from thin film of the TFE/HFP copolymer to make a laminate, which is essentially a coated article. Two articles, at least one of which is a coated article comprising a substrate coated with the composition are brought together into conforming contact such that one of the contacting surfaces is the coated substance. These two articles may in fact be a single article with two surfaces that are brought together, and more than two articles may be involved in the bonding, i.e., the bonding method of this invention is not limited to the bonding of two articles. After the two articles are brought together and are in conforming contact with one another, at least the region of this contact is heated above the melting temperature of the copolymer. This heating can be begun prior to the articles being brought together. Preheating of the coated article or articles can be advantageous if the coating is applied from a hot solution of a high concentration of copolymer in highly fluorinated solvent to avoid gel formation. With the articles in conforming contact, pressure is supplied to assure intimacy of contact for a time sufficient to effect the bond. This pressure can be an external force or can arise from the weight of the articles. The bonded articles ordinarily will be subsequently cooled to ambient temperature.

As stated above, one use for which the melting temperature range of TFE/HFP copolymers of this invention makes them surprisingly superior is as a processing aid in polyolefins. Superior performance was unexpectedly found to be associated with the near coincidence of the end of the melting temperature range for the TFE/HFP copolymer and the processing (extrusion) temperature $T_p$ for the polyolefin. As illustrated by examples to follow, the superior performance is not realized if copolymer melting ends either too far below $T_p$ or too far above $T_p$. The desired end of melting is in a range from 40° C. below $T_p$ to 25° C. above $T_p$, preferably from 30° C. below to 15° C. above $T_p$, and most preferably from 20° C. below $T_p$ to 5° C. above $T_p$.

The surprisingly superior performance of the TFE/HFP copolymer of the present invention as a processing aid, attributed to the near coincidence of polyolefin processing temperature and the end of the melting temperature range of the processing aid, was found to extend to other highly-fluorinated partially-crystalline polymers. Specifically, the fluoropolymer processing aids of this invention can be copolymers of two or more fluoromonomers, with composition that places $T_m(end)$ close to $T_p$. Suitable monomers include fluoroolefins and fluoroalkyl vinyl ethers. Preferred monomers include the perfluoroolefins TFE and $CF_2=CFR_f$, perfluoro (alkyl vinyl) ether $CF_2=CFOR_f$, and perfluoroalkyl ethylene $CH_2=CHR_f$, in which $R_f$ is a perfluoroalkyl group with 1–5 carbon atoms. Limited amounts of hydrogen-containing monomers may be employed provided the hydrogen content of the polymer does not exceed about 2 wt %, and preferably does not exceed about 1 wt %. Especially preferred are perfluoropolymers, and in particular copolymers of TFE and HFP, optionally including minor amounts of other preferred monomers, and most especially the TFE/HFP copolymer compositions of this invention and discussed above. These partially-crystalline fluoropolymer processing aids may be used alone or in conjunction with other processing aids known in the art, including fluoroelastomers.

When the TFE/HFP copolymer of this invention is used as a processing aid in a polyolefin for film applications, the polyolefin generally will have a melt index (ASTM D-1238) of 5.0 or less at 190° C., preferably 2.0 or less. For high-shear melt processing such as fiber extrusion or injection molding, even high-melt-index resins, for example, those having a melt index of 20 or more, may suffer processing difficulties. Such polyolefins may comprise any thermoplastic hydrocarbon polymer obtained by the homopolymerization or copolymerization of one or more monoolefins of the formula $CH_2=CHR'$ wherein R' is an alkyl radical, usually of not more than eight carbon atoms. In particular, this invention is applicable to the following: polyethylene, both of the high-density type and the low-density type having densities within the range 0.89–0.97; polypropylene; polybutene-1; poly(3-methylbutene); poly(4-methylpentene); and linear low density copolymers of ethylene and an alpha-olefin, such as propylene, butene-1, pentene-1, hexene-1, heptene-1, octene-1, decene-1, octadecene-1, or n-methylpentene-1.

Because of the different melt characteristics of the olefin polymers mentioned, the addition of the fluoropolymer process aids of this invention may be of greater value in some polyolefins than in others. Thus, polyolefins such as polypropylene and branched polyethylene, that have low molecular weight or broad molecular weight distributions and, therefore, have good melt flow characteristics even at low temperature, may not require the use of the fluoropolymer additives or be noticeably improved by them, except under unusual, adverse extrusion conditions. However, for polymers such as high molecular weight, high density polyethylene or linear low density ethylene copolymers, particularly those with narrow or very narrow molecular weight distributions, addition of the fluoropolymers is especially beneficial.

Such polyolefins are typically processed by extrusion techniques at melt processing temperatures $T_p$ in the range 175°–275° C. The commercially important blown-film process is usually carried out at $T_p$ in the range 200°–250° C., and commonly at 200°–230° C. $T_p$ in these blown-film processes is below, and in the lower range is substantially below, $T_m$ of prior art TFE/HFP copolymer resins as discussed above. Thus, these prior art resins would be solid at $T_p$ as described in U.S. Pat. No. 4,904,735.

The polyolefins and thus the polymer blend composition containing the fluoropolymer processing aid may contain assorted additives used in the art, such as but not limited to antioxidants, acid scavengers, light stabilizers, pigments, slip agents, and lubricants. In particular, finely divided solids such as silica or talc may be incorporated as antiblock agents.

It is important for effective performance as a processing aid that the fluoropolymer resin be well-dispersed in the host resin. Although precise quantitative characterization is not possible, it appears desirable that a significant fraction of the fluoropolymer resin be dispersed in the host with fluoropolymer particle size of less than about 0.5 μm and preferably less than about 0.3 μm. Since the raw dispersion particle size obtained in polymerization is typically 0.05–0.2 μm, little agglomeration is desired. Therefore, for processing aid use, techniques chosen for isolation of the fluoropolymer resin from the raw dispersion should be among those that preserve the fundamental particle character or yield loose agglomerates that are readily dissociated upon incorporation into the host resin.

For effective performance as a processing aid, the melt viscosity (MV) of the fluoropolymer should be neither too low nor too high. For highly fluorinated partially-crystalline fluoropolymers in general, the MV range $0.1 \times 10^3$ to $20 \times 10^3$ Pa.s is suitable and the range $0.5 \times 10^3$ to $15 \times 10^3$ Pa.s is preferred. For the TFE/HFP copolymers of this invention (HFPI of 6.4 to about 9), the MV range $0.1 \times 10^3$ to $10 \times 10^3$ Pa.s appears to be suitable. It appears that, as the MV of the TFE/HFP copolymer resins decreases, such resins become less effective as processing aids in the presence of antiblock agents as the difference between $T_p$ and $T_m$(end) increases. Accordingly, a minimum MV of $0.5 \times 10^3$ Pa.s is preferred and the MV range $0.5 \times 10^3$ to $5 \times 10^3$ Pa.s is most preferred for these copolymers. The fluoropolymer of the blend composition preferably has a $T_m$(end) from about 180° C. to about 255° C., and more preferably from about 180° C. to about 235° C.

The concentration of fluoropolymer processing aid in the host resin at fabrication into the final article should be high enough to achieve the desired effect in improving processability, but not so high as to have adverse economic impact. The amount required can vary with the effect desired, the host resin, additives used in the host resin, and the processing conditions which may be different from the laboratory conditions reported in the following examples. Under certain conditions, concentrations of 100 ppm or less, as low as 50 ppm or even 25 ppm, can be effective. Under other conditions, the effective amount may be 1000, 2000, or even 5000 ppm. For special purposes, concentrations of 10% or even 25% may be appropriate. Thus from about 25 ppm to about 25% by weight of the fluoropolymer may be present, with preferred ranges being from about 100 ppm to about 10% by weight, and even more preferable, about 100 ppm to about 2000 ppm by weight of the fluoropolymer. The fluoropolymer processing aid can be incorporated into the host resin at the desired final concentration, or can be incorporated into a masterbatch or concentrate that is added to the host resin in a ratio calculated to yield the desired final concentration. When the fluoropolymer is a TFE/HFP copolymer and a masterbatch is to be made, it is advantageous to subject the copolymer powder to fluorine treatment. Alternatively, it is advantageous to use copolymer isolated from its polymerization medium by a technique comprising the use of a high concentration of salt-type electrolyte such as ammonium carbonate or potassium fluoride. In either case, the effectiveness of the masterbatch is enhanced.

EXAMPLES

The evaluations reported in the following examples were made using a C. W. Brabender Instruments, Inc. Computerized Plasti-Corder® equipped with a 19.1-mm (0.75-inch) extruder with a 25/1 length/diameter ratio. The screw had 10 feed flights, 10 compression flights with a 3:1 compression ratio, and 5 metering flights. Operating parameters were controlled by four independent heating zones, four pressure transducers, and a torque measuring drive unit with 1–120 rpm capability. The instrument was equipped with software for rheometric extrusion testing. The extrusion head used for these tests was a horizontal ribbon (tape) die body, supplied by C. W. Brabender, made from #416 ferritic stainless steel and designed to accept die inserts such that the exit width was 2.54 cm (1.0 inch), the land length was 1.016 cm (0.4 inch) and the die gap was a nominal 0.508 mm (0.02 inch). Die inserts used were chrome-plated tool steel. The die inserts were cleaned prior to each evaluation by either scrubbing with a Scotchbrite® pad (3M Company) and washing with acetone, or by scrubbing with a Scotchbrite® pad, washing with acetone, and burning.

In operation, the required machine conditions were set, and the polymer resin was extruded, usually at 60 rpm, until equilibrium was reached as judged by constant throughput and constant die pressure. For a linear low density polyethylene (LLDPE) with a melt index (MI) of 1.0 at 190° C., extrusion at 60 rpm at 200° C.

measured at the die gave a throughput of about 25-28 g/min and a die pressure of about 19-30 MPa (2800-4300 psig), depending on the exact die gap. As will become apparent, various extrusion temperatures were employed depending on the fluoropolymer being tested. Throughput and die pressure will, of course, change with temperature. Experiments were carried out using the following sequence of feed resin: first polyolefin resin without fluoropolymer or antiblock agent, second resin containing fluoropolymer process aid, and third resin containing both fluoropolymer process aid and antiblock agent. When equilibrium was reached for each composition, unless otherwise stated, a sequence of screw speeds was employed producing new equilibrium values of throughput and die pressure at each speed. Surface quality of the extrudate was judged by visual examination.

When changing the feed composition, the initial output parameters corresponded to the previous equilibrium, and then gradually changed to a new equilibrium. In the examples that follow, when switching from the natural polyolefin to the blend containing fluoropolymer, the Brabender feed hopper was run empty (or vacuumed out). The blend containing the fluoropolymer process aid was prepared by shaking the components vigorously in a polyethylene bag for approximately two minutes. The blend was then put into the feed hopper. A similar procedure was followed in switching from polyolefin feed containing fluoropolymer process aid to polyolefin feed containing fluoropolymer and antiblock agent.

The performance of a particular fluoropolymer as a processing aid was characterized as follows. For each feed composition and chosen melt processing temperature $T_p$, extrusion was carried out for a sequence of screw speeds, usually 30, 60, 90 and 120 rpm. Throughput and die pressure p were recorded. From this data set, standardized values of p at five throughput values, usually 15, 20, 25, 30 and 35 g/min, were calculated by linear interpolation between the two bracketing data points. Pressures are designated $P_o$ for the natural polyolefin, $P_1$ for the polyolefin with fluoropolymer process aid, and $P_2$ for the polyolefin with fluoropolymer and antiblock agent. The performance of a fluoropolymer is characterized by the pressure differences $\Delta p_1$ and $\Delta p_2$ which are the averages, respectively, of the quantities $\Delta p_{1i}=(P_{oi}-P_{1i})/P_{oi}$ and $\Delta p_{2i}=(P_{oi}-P_{2i})/P_{oi}$ calculated for the five throughput values i. Large values of $\Delta p_1$ and $\Delta p_2$, and $\Delta p_2$ comparable to $\Delta p_1$, are desired.

$T_p$ was recorded both as the die temperature set point and the melt temperature at the die. Melt temperature may differ from die temperature set point by a few degrees. Melt temperature may also vary slightly with screw speed. The single temperature reported as $T_p$ in the examples is the die temperature set point.

After each series of examples, the die inserts were removed and the extruder and die body were purged extensively using a 50/50 blend of LLDPE with MI=1.0 and a 20% silica masterbatch, followed by 100% of the same LLDPE. Replacement die inserts were prepared and installed. After calibration of the transducers, the natural polyolefin resin was run to establish equilibrium conditions and to assure that reliable data were being obtained. If previously established equilibrium values for the natural resin were not achieved, the cleanout procedure was repeated. Alternatively, the extruder and die body were completely disassembled and the screw, barrel, die assembly, transducers, and thermocouples were thoroughly cleaned, first with a motor-driven brass brush and finally with acetone solvent. An extrusion test for equilibrium values was then carried out as described above.

The polyolefin resin used both for testing and purging was GRSN 7047, an LLDPE with MI=1.0 in granular form from Union Carbide Corp.

Unless otherwise specified, the antiblock agent used was Super Floss ® silica (Manville Sales Corp.) as a 20 wt % masterbatch in low density polyethylene with MI=9.0 (masterbatch obtained from Ampacet Corp.) The silica concentration in the final extrudate was 5000 ppm. This same masterbatch was used as the purge compound.

Figure 1:
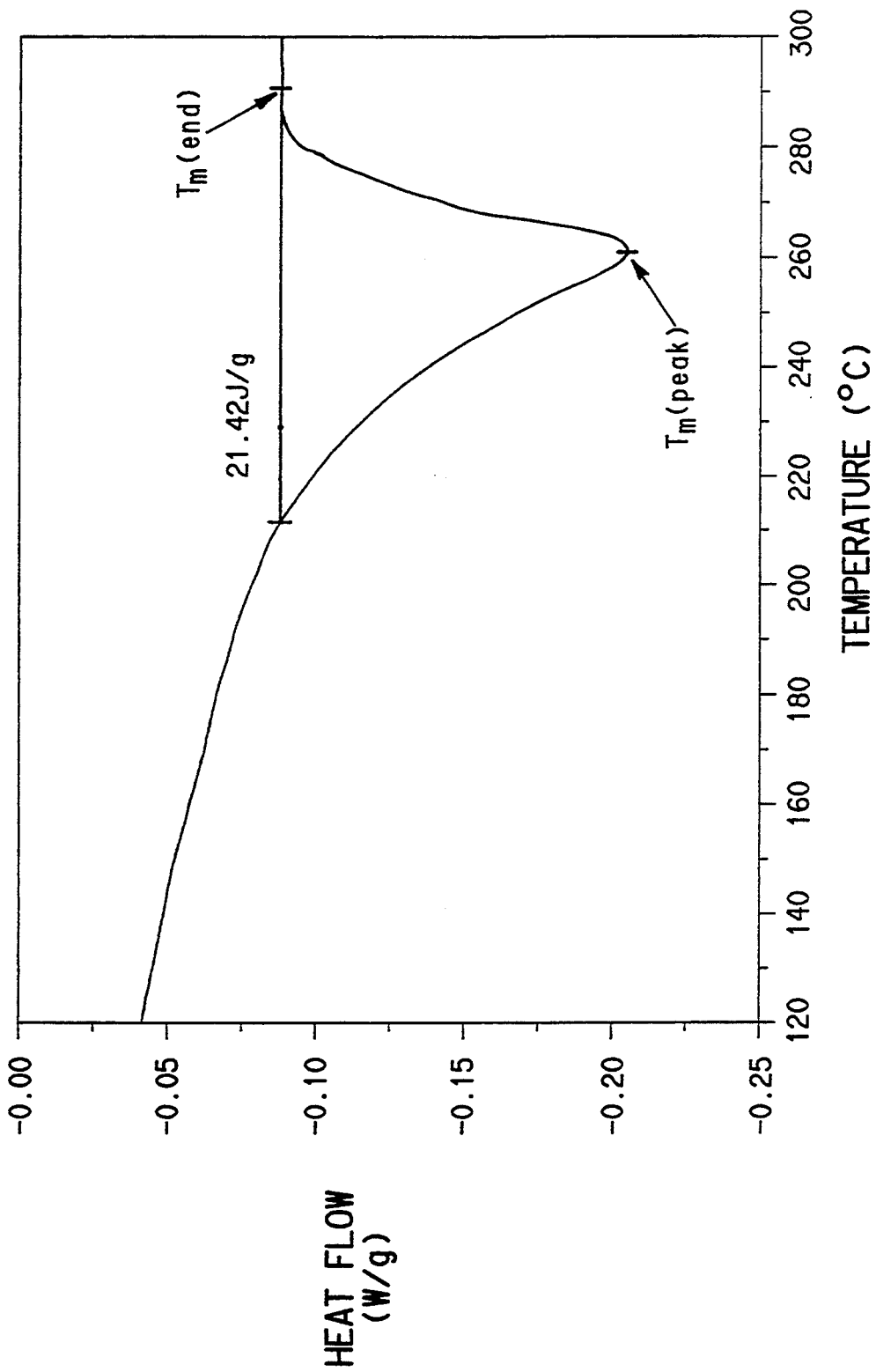
FIG. 1 is a DSC trace for a prior-art TFE/HFP copolymer.
Figure 2:
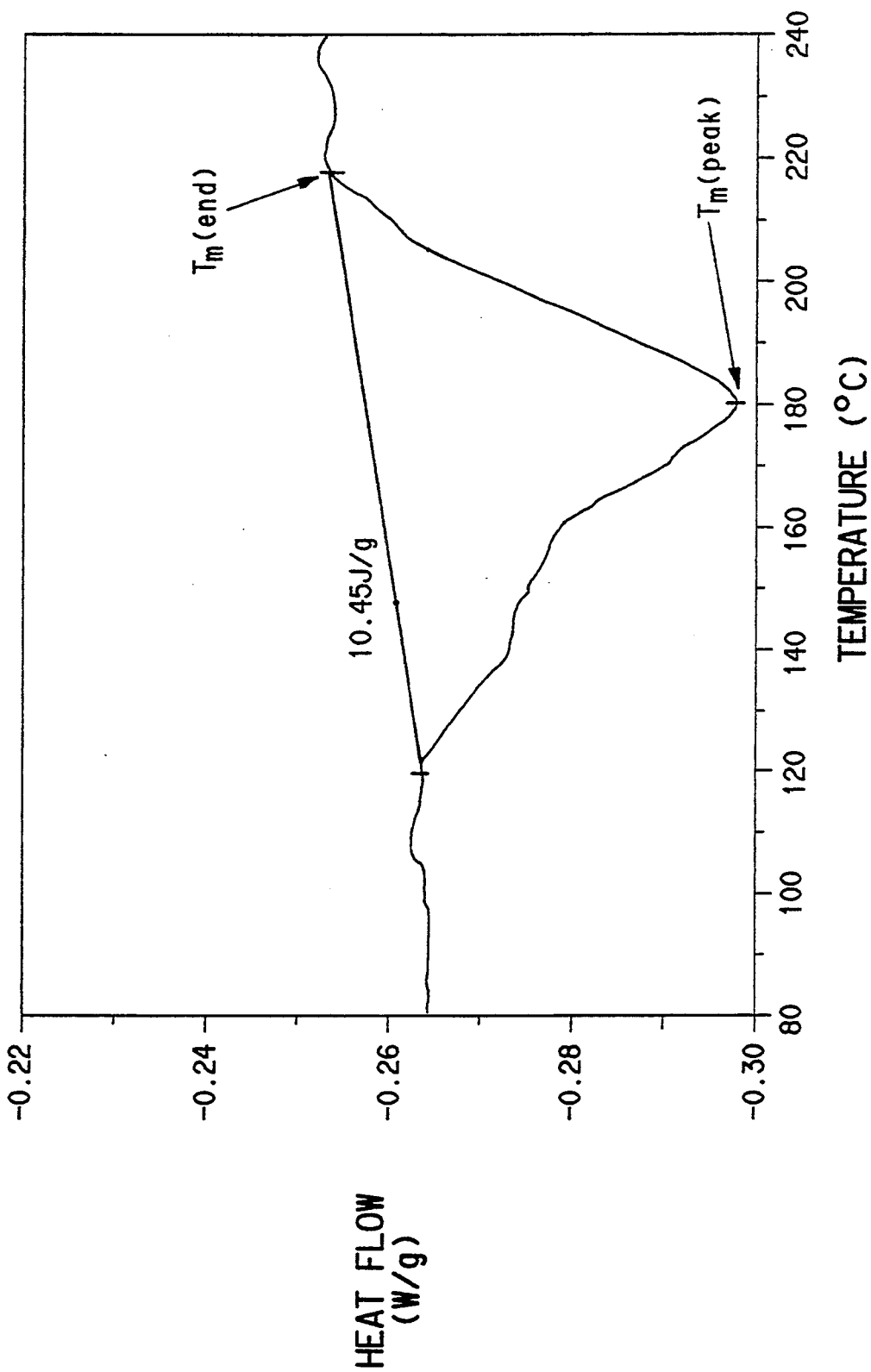
FIG. 2 is a DSC trace for a TFE/HFP copolymer of this invention.

Melting characteristics of fluoroplastics were determined by DSC by the method of ASTM D-4591-87, except that the end of the melting range, here designated $T_m$(end), was determined according to the general method ASTM E794-85. $T_m$(end) is regarded as the temperature at which the entire specimen is melted. FIG. 1 shows the DSC melting trace for a commercial TFE/HFP copolymer resin of Type I in ASTM D-2116-83. The width of the melting endotherm may be due to a distribution of polymer composition in the sample. Heat of fusion for Type I copolymer is about 20-24 J/g. FIG. 2 shows the DSC trace for an experimental TFE/HFP copolymer resin with higher HFP content and consequently lower melting temperature range than the copolymer of FIG. 1. Crystallinity is also lower as indicated by lower heat of fusion, about 10.5 J/g. For TFE/HFP copolymers with $T_m$(peak)=170°-180° C., heat of fusion is typically 8-14 J/g. Since thermal history can affect crystallinity, DSC specimens were dried at temperatures no higher than 10 100° C.

Fluoropolymer compositions were determined by infrared spectroscopy on 0.025-0.051 mm thick films pressed at 300° C. For TFE/HFP copolymers, Fourier transform infrared spectroscopy was employed in the method described in U.S. Pat. No. 4,380,618. In applying this method, the peak absorbances of bands found at about 10.18 $\mu$m and at about 4.25 $\mu$m were used, not the absorbances at these exact wavelengths unless they were also the peak absorbances. HFP content is expressed as an index HFPI, the ratio of the two peak absorbances. Multiplication of HFPI by 2.1 would yield the HFP content in mol % according to current calibration by $^{19}$F NMR.

Quantitative measurement of carboxylic acid and acid fluoride end group populations in the TFE/HFP copolymers of this invention were carried out by infrared analysis (Nicolet model 5DX instrument) on films approximately 250 $\mu$m thick which were cold-pressed from the dried copolymer powders, following the general method taught in U.S. Pat. No. 3,085,083. Calibration factors (CF) were determined by measuring the absorptivities of model compounds containing the end groups of interest. The levels of endgroups were then calculated by the equation:

$$\text{End groups per } 10^6 \text{ C atoms} = \frac{\text{absorbance} \times CF}{\text{film thickness}}$$

where film thickness is in $\mu$m.

The absorbance at 5.31 $\mu$m attributed to acid fluoride end groups was employed with a CF of 669. Analysis of high levels of acid end groups can be a particular problem since absorbances for bonded and free acid ends at 5.64 and 5.52 $\mu$m tend to overlap. For this work, the absorbance for free acid ends at 2.81 μm was employed with a CF of 787. Other work has shown that the absorptivities at 5.64 and 5.52 μm for the two acid structures are nearly the same, so the level of bonded acid end groups was determined by taking the ratio of these two absorbances and multiplying the ratio by the level of free acid end groups obtained from the 2.81 μm absorbance.

Melt viscosities of the partially-crystalline fluoropolymers were determined by ASTM method D1238-52T modified as described in U.S. Pat. No. 4,380,618, except that a weight of 833 g was used for samples with MV below about $10^3$ Pa.s.

Example 1

A cylindrical, horizontally disposed, water-jacketed, paddle-stirred, stainless steel reactor having a length to diameter ratio of about 1.5 and a water capacity of 79 parts by weight was charged with 48.5 parts of demineralized water. The reactor was heated to 65° C., evacuated, purged with TFE, and then evacuated again. The vacuum in the reactor was then used to draw in a solution of 0.055 parts of Zonyl ® TBS surfactant in water (1.8 parts). The solution was rinsed into the reactor with another 0.88 parts of water. The reactor was then sealed, agitation was begun at 38 rpm, and the reactor temperature was raised to 103° C. After the temperature had become steady at 103° C., HFP was added slowly to the reactor until the pressure was 545 psig (3.8 MPa). Then TFE was added to the reactor to achieve a final pressure of 600 psig (4.1 MPa). Then 1.32 parts of a freshly prepared 0.45 wt % aqueous solution of ammonium sulfate (APS) initiator were pumped into the reactor at 0.11 part/minute. Thereafter, a 0.93 wt % APS solution was added to the reactor at 0.022 part/minute was added to the reactor for the remainder of the polymerization. After polymerization had begun as indicated by a 10 psig (0.07 MPa) drop in reactor pressure, additional TFE was added to the reactor to maintain pressure constant at 600 psig and agitator speed was increased to 50 rpm and held essentially constant for the remainder of the batch. No dwell period was used, and 0.3 part of TFE was added during the first 20 min after polymerization had begun. Total TFE added to the reactor in 403 minutes after initial pressurization was 14.5 parts. The agitator was then turned off, the TFE feed was stopped, and the reactor was cooled. When the temperature reached 90° C., the reactor was vented and the initiator feed was stopped. After venting to nearly atmospheric pressure, the reactor was purged with nitrogen to remove residual monomer. The dispersion was then discharged from the reactor and coagulated by vigorous stirring to obtain a TFE/HFP copolymer powder which was dried in a vacuum oven at 100°–120° C. before being characterized. The resin had an MV of $0.6 \times 10^3$ Pa.s, an HFPI of 8.87, a $T_m$(peak) of 171° C., and a $T_m$(end) of 204° C.

Example 2

The reactor and charging procedure described in Example 1 were employed to add a total of 50.7 parts demineralized water and 0.081 part of Zonyl ® TBS surfactant. After sealing the reactor, the agitator was turned on at 38 rpm and the reactor temperature was raised to 108° C. After the temperature had become steady at 108° C., HFP was added slowly to the reactor until its pressure was 550 psig (3.8 MPa). Then TFE was added to the reactor to achieve a final pressure of 600 psig (4.1 MPa). Then 0.66 part of a freshly prepared aqueous solution containing both 0.85 wt % APS and 1.32 wt % KPS was added at a rate of 0.033 part/min for 20 minutes. Polymerization began during this 20 minutes as indicated by a 17 psig (0.12 MPa) drop in reactor pressure. No TFE was added during this 20 minute interval. At the end of the 20 minutes, the pressure was brought back to 4.1 MPa by the addition of 0.2 part of TFE. The remainder of the polymerization was carried out with TFE and initiator solution (0.24 wt % APS and 0.36 wt % KPS) additions as indicated below. The agitator speed was varied as needed to achieve the TFE feedrates shown below.

| Time Period (min) | TFE Feedrate (part/min) | Initiator Feedrate (part/min solution) |
|---|---|---|
| First 80 | 0.024 | 0.0154 |
| Next 60 | 0.032 | 0.0176 |
| Next 70 | 0.040 | 0.0198 |
| Next 70 | 0.050 | 0.0242 |
| Next 60 | 0.061 | 0.0286 |

After the TFE addition indicated above was complete, the reactor was cooled and vented, and the dispersion was discharged from the reactor as described in Example 1. The dispersion had 26.9 wt % solids. The raw dispersion particle size was 0.07 μm by photon correlation spectroscopy. A portion of the dispersion was cooled to 20° C. and was then coagulated by vigorous stirring to obtain a powder which was dried in a vacuum oven at 100° C. Analysis indicated the TFE/HFP copolymer resin to have an MV of $1.7 \times 10^3$ Pa.s, an HFPI of 8.34, a $T_m$(peak) of 166° C., and a $T_m$(end) of 201° C.

Example 3

A 5 wt % solution of a TFE/HFP copolymer synthesized by the procedure of Example 1 and having HFPI = 8.30, $T_m$(peak) = 170° C. and MV = $0.2 \times 10^3$ Pa.s was made by the following procedure at ambient pressure. Into a 50 ml Erlenmeyer flask were placed 1.6 g of TFE/HFP copolymer resin and 28.5 g of perfluoro(tetradecahydrophenanthrene), $C_{14}F_{24}$ (Flutec ® PP11, Rhone-Poulenc). The loaded flask was placed in a silicone oil bath at 160° C. and stirred with a glass-coated magnetic stirrer bar. Dissolution was complete in about 30 minutes. A reflux condensor was not necessary since the wall of the flask was cool enough to condense the solvent. Upon cooling to room temperature, the solution formed a clear gel which readily redissolved upon warming to about 105° C.

Example 4

Solutions of the TFE/HFP copolymer used in Example 3 were made under autogenous pressure in four different solvents. Borosilicate glass tubes with 8-mm outside diameter and 1-mm wall were sealed at one end. Solvent and polymer powder were then introduced in proportions to provide a 5 wt % solution of polymer in solvent. Enough solvent and polymer powder were placed in the tubes so that, when the tubes were sealed with final lengths of 7.5–10 cm, solvent and polymer powder together occupied about half of tube volume. The tubes were then placed in holes in an aluminum block that was suitably heated and insulated. Other holes in the block served as viewing ports to observe the dissolution process in the tubes. Temperature was measured by three thermocouples placed within a few mm of the tube at different positions along the tube and could be controlled to ±0.5° C.

The temperature was increased at a rate of about 1° C./min until the polymer powder dissolved. Dissolution was judged visually, and the temperature at which dissolution was complete was designated $T_D$. Once dissolution occurred, the block was cooled in 5° C. increments. By tilting the block and observing the solution behavior, the temperature $T_C$ at which recrystallization occurred was estimated from the point of significant viscosity increase or the onset of turbidity. Likewise, upon reheating in 5° C. increments, the temperature $T_M$ (the solution melting point) at which complete dissolution occurred on reheating, was estimated from the point of significant viscosity decrease or the loss of turbidity. Solvents used and the results are shown in Table 1.

TABLE 1

TFE/HFP Copolymer in Different Solvents

| Solvent | $T_D$ (°C.) | $T_C$ (°C.) | $T_M$ (°C.) |
|---|---|---|---|
| $C_6F_6$[a] | 85–90 | 75 | 88 |
| $C_7F_{14}$[b] | 155 | 115 | 155 |
| $C_{10}F_{18}$[c] | 100–125 | 75–100 | 100–125 |
| $C_{14}F_{24}$ | 115 | 80 | 113 |

[a] Hexafluorobenzene
[b] Perfluoro(cyclohexane)
[c] Perfluorodecalin

Example 5

The procedure of Example 4 was followed to dissolve the TFE/HFP copolymer of Example 3 in $C_{14}F_{24}$ at three different concentrations. Results shown in Table 2 suggest greater solution stability at lower polymer concentration.

TABLE 2

Concentration Dependence of Solubility

| Polymer (wt %) | $T_D$ (°C.) | $T_C$ (°C.) | $T_M$ (°C.) |
|---|---|---|---|
| 1 | 105 | 45–50 | 87 |
| 5 | 110–120 | 85 | 103 |
| 10 | 130 | 110 | 120 |

Example 6

An aliquot of the TFE/HFP copolymer used in Example 3 was treated with fluorine to reduce the population of polymer acid end groups from 1010/10$^6$ carbon atoms as-polymerized to 110/10$^6$ carbon atoms. Fluorine treatment may also reduce the concentration of any residual surfactant. For a 5 wt % solution in $C_{14}F_{24}$ made by the procedure of Example 4, results were $T_D = 160°–165°$ C., $T_C = 155°$ C., and $T_M = 160°–165°$ C. These values are all distinctly higher than the values in Examples 4 and 5 for the same polymer before fluorine treatment. DSC showed no significant difference between the as-polymerized and the fluorinated samples. Since $C_{14}F_{24}$ is not a polar solvent, it is difficult to explain the differences in solution behavior.

Example 7

A 5 wt % solution identical to that of Example 3 was prepared by the procedure of Example 3 except that the temperature of dissolution was 150° C. The solution gelled when cooled to room temperature, but was readily restored when reheated. New die inserts for the C. W. Brabender extruder described above were cleaned with acetone, heated to about 150° C., and dipped in the solution at 150° C. The solution was observed to wet the die inserts uniformly. Excess solution was allowed to drain off, and the inserts were baked in an oven for 2 hr at 200° C. Under visual inspection, the copolymer coating on the die inserts appeared to be uniform and smooth with no uncoated areas. Water dropped on the inserts formed beads. The coated die inserts were used in a test extrusion of GRSN 7047 LLDPE at 60 rpm and 220° C. Extrudate at startup was clear with no melt fracture, and the die pressure was immediately about 50% of the value obtained with uncoated inserts under the same conditions.

Example 8

A 5 wt % solution of a TFE/HFP copolymer with HFPI = 8.81 and MV = $1.2 \times 10^3$ Pa.s in $C_{14}F_{24}$ was prepared by the procedure of Example 3, except that dissolution temperature was 150° C. Copper, brass, aluminum, stainless steel, and galvanized steel coupons (2.5 cm × 12.5 cm × 0.6 mm, approximately) were cleaned with acetone and dipped at ambient temperature into the solution at 150° C. Excess solution was drained off and the metal pieces were baked overnight in an oven at 300° C. Coating quality was good as judged by visual inspection and as demonstrated by water nonwetting. Adhesion of coatings to the metals was good as judged by difficulty in scraping off the coatings with a laboratory knife.

Example 9

Solutions at 5, 3, and 1 wt % were prepared as in Example 8. The 3 and 5 wt % copolymer/solvent system both gelled when cooled to room temperature, but the 1 wt % solution remained fluid. Glass microscope slides were washed with acetone, dried, and dipped at ambient temperature into the three solutions maintained at 150° C. Excess solution was drained off and different slides were baked overnight at 150°, 200°, or 250° C. No differences were noted in appearance or in adhesion as judged by probing and scraping with a laboratory knife. However, under optical and scanning electron microscope examination, coating uniformity appeared to improve with solution concentration.

Separately, it was established that 2.5 wt % is the approximate concentration limit at which solutions of this copolymer resin in $C_{14}F_{24}$ remain as stable and fluid copolymer/solvent systems at ambient temperature, and may be applied to substrates by spray techniques. Centrifuging did not change the concentration of TFE/HFP copolymer in the $C_{14}F_{24}$.

A 1 wt % solution of this same copolymer in perfluorodecalin ($C_{10}F_{18}$) formed a stable copolymer/solvent system at room temperature. The concentration limit for room temperature stability in $C_{10}F_{18}$ was not determined.

Example 10

Solution A was prepared as in Example 8, except that concentration was 2.5 wt %. Solution B was prepared as in Example 8, except that the solvent was predominantly perfluoro(triamylamine) (Fluorinert ® FC-70 from 3M). When cooled to room temperature, the latter solution became a cloudy suspension but did not gel. Agitation indicated that viscosity was low and was judged similar to that of FC-70. After centrifuging, the concentration of TFE/HFP copolymer in the FC-70 was essentially zero, confirming a suspension.

System A and suspension B, and a standard mold release (No. 1725, McLube) were sprayed at room temperature onto different sectors of a mold for size 214 o-rings. Preheated molds were found to yield the same results as molds at room temperature when sprayed. The sprayed mold was held empty in a press at 177° C. for about 15 minutes. Then, a compound based on a perfluoroelastomer of the type disclosed in U.S. Pat. No. 4,035,565 was press-cured at 177° C. for 15 min in the mold in a series of moldings. Results were about the same for o-ring cavities sprayed with system A and suspension B. For the first cycle, o-rings had a matte finish with excess TFE/HFP polymer resin on the surface. For the second cycle, the o-rings were glossy with some surface imperfections. For the third cycle, the o-rings had high gloss. The o-rings released from the mold equally well for all three cycles, popping out with very little prodding to loosen them. For the cavities sprayed with the conventional mold release, more effort was needed to remove the o-rings from the mold.

Example 11

A room-temperature copolymer/solvent system identical to the 1 wt % system of Example 9 was used. The copolymer/solvent system was sprayed, using an aerosol sprayer ("Sure Shot Aerospray", Milwaukee Sprayer Mfg. Co.), onto a hot (177° C.) chrome-plated 12-cavity compression mold for AS 568-214 o-rings. The coated mold was placed in a circulating air oven for 30 min at 250° C., and was then moved to a laboratory press for molding tests. Two carbon-black-filled fluoroelastomer compounds designed for o-ring service were each molded in six press-cure cycles of 4 min at 177° C. in the coated mold. The first compound molded was based on a fluoroelastomer of the type disclosed in U.S. Pat. No. 3,051,677 and incorporated a polyol curing system. O-ring release was good for the first molding cycle, then appeared to improve during the second and third cycles and level off for the remainder of the six cycles with this compound. The second compound molded was based on a fluoroelastomer of the type disclosed in Comparative Example A of U.S. Pat. No. 4,973,633 and incorporated a peroxide curing system. O-ring release was good for the first cycle, but became progressively more difficult throughout the remainder of the six cycles with this compound.

Example 12

The solution of Example 8 was used. Pieces of cured ethylene/propylene/diene-monomer (EPDM), silicone, and neoprene elastomers and a fluoroelastomer at room temperature were dipped into the solution at 150° C., drained of excess solution, dried, and baked overnight in an oven at 250° C. Coatings on all elastomer substrates were shiny and well-adhered.

Separately, cured EPDM rubber was coated and dried as above, then baked at 177° C. for about 2 hr. The coating was judged to be of good quality and well adhered to the EPDM.

Example 13

A 3 wt % solution identical to that of Example 9 was painted onto two pieces of polyimide film (Kapton ® grade 300HN, Du Pont) at room temperature and dried in an oven for one hour at 200° C. The two pieces were placed in a laboratory press with coated sides together and pressed at 300° C. and 417 psig for 30 sec, then cooled to room temperature. Peel strength was measured in the range 0.2–0.3 lb/in. Without the coating, the pieces would not bond together.

A 5 wt % solution of the TFE/HFP copolymer used in Example 8 was prepared in Fluorinert ® FC-70 as in Example 11 and cooled to room temperature. As in Example 10, a low-viscosity cloudy suspension resulted. This suspension was painted onto both sides of two pieces of commercial 0.25-mm TFE/HFP copolymer film (Teflon ® FEP fluorocarbon film 1000A, Du Pont) and onto one side of each of two pieces of polyimide film described above and of two pieces of highly-polished 0.2-mm aluminum film. The coatings were dried for one hour at 200° C. Laminates of the FEP film between the polyimide films and between the aluminum films were pressed at 300° C. and 417 psig for 30 sec, then cooled to room temperature. Control laminates were prepared with no coatings on the components. Peel strengths were measured at room temperature in a tensile testing machine. For the polyimide laminates, the coated sample had peel strength of 1.8 lb/in while the control could not be tested, exhibiting no bond and falling apart. For the aluminum laminates, the coated sample and the control had peel strengths of 4.0 and 0.5 lb/in, respectively.

Example 14

A TFE/HFP copolymer with HFPI=6.91 and MV=$0.49 \times 10^3$ Pa.s as polymerized and the TFE/HFP copolymer of Example 8 treated with fluorine to reduce the acid end group population were used to prepare 2.5 wt % solutions in $C_{14}F_{24}$ on a hot plate at approximately 130° C. The solutions, chrome sheets, and a doctor knife were preheated at 130° C. in a circulating air oven. A thin wet film of each solution was drawn down onto separate chrome sheets in the oven using the doctor knife set to a 0.13-mm gap. After at least 15 min drying in the oven, the coated sheets were further dried in an oven for 60 min at 250° C. The kinetic coefficient of friction (COF) of each coated surface was measured at room temperature against a high density polyethylene (HDPE) countersurface. COF results were 0.16 for the unfluorinated coating and 0.13 for the coating of fluorine-treated resin, compared with 0.19 for uncoated chrome and 0.11 for sintered PTFE against HDPE. Adhesion of both coatings to the chrome appeared to be very good.

Example 15

A 1 wt % solution of the as-polymerized TFE/HFP copolymer resin of Example 14 was prepared at 120° C. and cooled to room temperature. To improve their lubricity, 0.36-mm diameter stainless steel wires were coated as follows. Wires were degreased by immersion in 1,1,2-trichloro-1,2,2-trifluoroethane (CFC-113) for 5 min, air-dried, and dip-coated at room temperature in a tube with 3.2 mm inside diameter filled with the copolymer/solvent system. After air drying, the coated wires were further dried in a circulating air oven for 10 min at 120° C. followed by 60 min at 250° C. The coated wires appeared smooth when inspected under a microscope at 25× magnification. The wires felt lubricious, and the coatings did not appear to be removed by rubbing.

Example 16

A. The TFE/HFP copolymer resin of Example 15 was used to make 1, 2,3,4 and 5 wt % solutions in $C_{14}F_{24}$ by dissolving at about 120° C. (1–3 wt %) or at about 140° C. (4–5 wt %) with stirring. Upon cooling to room temperature without stirring, the 3–5 wt % solutions formed solid gels, the 2 wt % solution formed a loose but still flowable gel, and the 1 wt % solution remained a low-viscosity copolymer/solvent system. Taken together with the results of Example 9, these observations suggest that the concentration limit at which systems remain stable and fluid at ambient temperature may vary with copolymer composition.

Identical solutions were cooled with continued stirring which was stopped when solution temperature was close to ambient temperature. None of the solutions had gelled, and even the 5 wt % copolymer/solvent system was readily flowable. The viscosities of the 3–5 wt % systems were observed to increase with time at a rate which increased with concentration. Over a period of days, the 3–5 wt % systems increased in viscosity until they could be described as loose gels. None of them formed the solid gels resulting from the quiescent cooling as described above. These loose gels were easily broken up by stirring, and the restirred systems gradually returned again to the loose gel state. Little or no change with time was observed in the 1–2 wt % copolymer/solvent system.

The 3 wt % copolymer/solvent system cooled with stirring was used at room temperature to coat a chrome sheet also at room temperature using the doctor knife set to a 0.25-mm gap. The wet film was dried at room temperature overnight, then heated in an oven for 30 min at 275° C. The coating was observed to be smoother than the coatings of Example 14 prepared at elevated temperature.

B. Example 16A shows the beneficial effect of agitating the copolymer solution made by dissolving the copolymer in the solvent at an elevated temperature as it is cooled and becomes a copolymer/solvent system during cooling, namely the viscosity is reduced, and if the concentration of copolymer were such as to cause gelling of the system during cooling to room temperature, the agitation also prevents the gelation, whereby the fluid, stable copolymer/solvent system is present at room temperature.

Example 16B discloses a further improvement in the process of the making of a fluid, stable copolymer/solvent system of the new TFE/HFP copolymers disclosed herein. As stated above, during the cool-down accompanied by agitation, the polymer/solvent system of reduced viscosity forms from the solution. If the agitation were stopped when the system reaches room temperature as in the case of Example 16A, the viscosity of the system can increase upon standing at room temperature. It has been discovered that when the system is agitated additionally after it reaches room temperature, this further reduces the viscosity of the system. When the agitation is discontinued and the system is stored at room temperature, the system may not undergo any significant increase in viscosity, i.e., its viscosity is stabilized. Alternatively, the viscosity may increase with standing of the system, but the original lower viscosity can easily be restored by agitation. The agitation of the solution and polymer/solvent system can conveniently be carried out by stirring or other means which applies shear to the entire body of fluid so that localized viscosity increase cannot occur.

To demonstrate this improvement, three solutions of partially crystalline TFE/HFP copolymer (HFPI of 8.8 and melt viscosity of $1.18 \times 10^3$ Pa.s) were prepared by adding the copolymer slowly to $C_{14}F_{24}$ solvent while stirring, followed by heating of the mediums in an oil bath at about 140° C. with continued stirring until the polymer dissolved to form 5 wt %, 6 wt %, and 7 wt % solutions of the copolymer. These solutions were then allowed to cool while being stirred. The 5 wt % solution was stirred during cool-down with a magnetic stirrer providing the agitation. This stirrer did not have sufficient torque to stir the other solutions which exhibited greater tendency to thicken during cool-down. The 6 wt % solution was stirred with an overhead air motor stirrer and the 7 wt % solution was stirred with an overhead electric motor stirrer during cool-down, so that all three solutions were stable fluids when they reached room temperature. During this cool-down, the solutions became slightly cloudy, i.e., hazy. The stirring was continued for about 23 hours after the resultant copolymer/solvent systems reached room temperature. After discontinuance of this stirring the three mediums were each fluid, i.e., they were each capable of flowing with the application of little or no pressure and without any tendency to recover original shape after flow (deformation). In this example, the three systems exhibited fluidity by being pourable and being useful for dip coating of a substrate. The dip coating was carried out by dipping 0.3 mm diameter stainless steel wires at room temperature into the fluid systems. The resultant coating on each of the wires was dried at 45° C. and baked at 275° C. for 30 min to form a continuous coating on each of the wires. The 5 wt % copolymer system had a viscosity comparable to motor oil, and after storage of this system at room temperature for 7 months, the viscosity seemed unchanged. The 6 and 7 wt % copolymer systems also exhibited viscosity stability for a period of time, but viscosity slowly increased with standing. These systems did not gel, however, and their original lower viscosity could be restored by additional agitation. It is contemplated that this viscosity stability can be reached with shorter stirring time after reaching room temperature and that stable, fluid copolymer/solvent systems containing greater amounts of copolymer, e.g. about 10 wt % thereof, can be obtained.

The results described in this Example 16 are also applicable to copolymer suspensions which have a tendency to settle upon standing at room temperature. The suspended particles of copolymer in the solvent can be from such source as copolymer gel formed during cooling, which is then broken up into very fine particles by the agitation during the cooling. Higher proportions of copolymer, as described earlier herein, can be present for the copolymer suspension as compared to the stable system.

Example 17

Solutions of the TFE/HFP copolymer resin of Example 8 were prepared in $C_{14}F_{24}$ at 120° C. at concentrations of 0.15, 0.30, 0.75, 1.5 and 3.0 wt %, and were used at 120° C. in the following coating work. A silicon wafer was scribed, cut into pieces about 2.5 cm square, cleaned with a soak in methylene chloride, rinsed with methanol, and dried in a vacuum oven at 150° C. A silicon square was immersed in each of the solutions maintained at 120° C., held for 30 min, and then withdrawn from the solution at a speed of 2 cm/min. The coated squares were dried for 15 min on a hot plate in air at 120° C. Thicknesses of the resulting films were measured by ellipsometry [Macromolecules 24, 5948 (1991)] using a Spectroscopic Ellipsometer (Sopra), and the quality of the surfaces was assessed by contact angle measurement with water [G. M. Bartenev and V. V.

Lavrentev, Friction and Wear of Polymers, Tribology Series, 6, Elsevier (1981)]. As shown by the results in Table 3, low surface energy films as thin as 57 angstroms were made. Characterization of the wafer coated with the 0.15 wt % solution by atomic force microscopy [Science News 135, 200 (1989)] indicated that coating coverage was probably incomplete, based on detection of regions with surface smoothness characteristic of a bare silicon wafer. The observations suggest that concentrations of at least about 0.5 wt % are needed by this coating technique and on this particular substrate to achieve film surfaces that are fully characteristic of the copolymer. The silicon squares coated with the three most concentrated solutions were heated again for 5 min on a hot plate at 204° C. with no significant change in coating film thickness.

TABLE 3

Properties of Dip-Coated Films on Silicon

| Conc. (wt %) | Contact ∠ Advancing | Contact ∠ Receding | Thickness (angstrom) |
|---|---|---|---|
| Uncoated Si | 47° | 16° | — |
| 0.15 | 114° | 58° | 57 |
| 0.30 | 115° | 65° | 63 |
| 0.75 | 117° | 95° | 197 |
| 1.5 | 114° | 93° | 505 |
| 3.0 | 116° | 94° | 835 |

Example 18

A 3 wt % solution of TFE/HFP copolymer in $C_{14}F_{24}$ identical to that of Example 18 was used to apply coatings on 5.1-cm diameter silicon wafers by spin coating. The spinning stage of a spin coater was enclosed in a chamber controlled at an interior air temperature of about 105° C. A small quantity, about 1-2 ml, of the solution maintained at 100° C. was placed in the center of the disk at rest with a pipette, and the disk was then spun at chosen speed. The disk was spun for about 2 min which assured that the coating was dry, removed from the chamber and cooled to room temperature, and the copolymer film thickness was then measured by ellipsometry. Spinning speeds and resultant film thicknesses are shown in Table 4.

TABLE 4

Summary of Spin Coating Experiments

| Expt. | Spinning Rate (rpm) | Film Thickness (angstrom) Center | Film Thickness (angstrom) Edge |
|---|---|---|---|
| 1 | 500 | 652 | 672 |
| 2 | 750 | * | 369 |
| 3 | 850 | 80 | 80 |
| 4 | 1000 | * | 125 |
| 5 | 2000 | 180 | 285 |

*Not uniform and unable to measure.

Example 19

The TFE/HFP copolymer resin of Example 2 was tested as an extrusion process aid by the evaluation procedure described in the introduction to the examples. Results of the extrusion experiments are summarized in Table 5. Comparison of $\Delta p_2$ with $\Delta p_1$ shows that the fluoropolymer additive retains its exceptional effectiveness even when the antiblock is present. As indicated by the last column, $T_p$ ranged from slightly below to about 25° C. above $T_m(end)$.

The same resin was also isolated from the dispersion by shear coagulation at 88° C. When evaluated as a processing aid, the dry copolymer powder from 88° C. coagulation was significantly less effective, with $\Delta p_2$ in the range of only 27-40% for the three test temperatures. This is interpreted as an indication that the resin agglomerates were not as readily dissociated upon incorporation into the polyolefin as was the product of coagulation at lower temperature.

TABLE 5

Extrusion Test Results for Example 19
Sample Coagulated at 20° C.

| $T_p$ (°C.) | $\Delta p_1$ (%) | $\Delta p_2$ (%) | $T_m(end) - T_p$ (°C.) |
|---|---|---|---|
| 195 | 47.3 | 47.0 | 6 |
| 210 | 53.0 | 51.0 | −9 |
| 225 | 52.0 | 49.8 | −24 |

Example 20

A series of TFE/HFP copolymers prepared generally by the methods of Examples 1 and 2 with variations in the details of ingredients and amounts charged, of the reaction conditions, and of the method of isolation had the properties listed in Table 6. These materials were tested at temperatures $T_p$ shown in the table by the extrusion procedure described above in the introduction to the examples. TFE/HFP copolymer resin concentration was 500 or 1000 ppm. No systematic variation of performance with TFE/HFP resin concentration was in this range was discerned, so values are not presented. Values of $\Delta p_1$ and $\Delta p_2$ were calculated from the raw data and are plotted against $T_m(end)-T_p$ in FIGS. 3 and 4, respectively. The data for the resin of Example 1 are presented as sample No. 7 in Table 6 and are included in the plots. The greatest effectiveness of the fluoropolymer is at values of $T_m(end)$ near $T_p$, i.e., for $T_m(end)-T_p$ near zero. Effectiveness extends to positive values of $T_m(end)-T_p$, indicating that the fluoropolymer need not be completely melted as taught by Blatz, U.S. Pat. No. 3,125,547.

TABLE 6

Properties and Test Temperatures
for TFE/HFP Copolymers of Ex. 20

| No. | HFPI | $T_m(peak)$ (°C.) | $T_m(end)$ (°C.) | MV ($10^3$ Pa·s) | $T_p$ (°C.) |
|---|---|---|---|---|---|
| 1 | 7.60 | 191 | 234 | 0.34 | 225, 260 |
| 2 | 8.49 | 170 | 203 | 0.35 | 204, 230 |
| 3 | 6.91 | 185 | 225 | 0.49 | 235, 260 |
| 4 | | 169 | 210 | 0.52 | 204, 230, 260 |
| 5 | | 166 | 200 | 0.54 | 204, 230 |
| 6 | 7.80 | 177 | 245 | 0.56 | 204, 218, 250 |
| 7 | 8.87 | 171 | 204 | 0.59 | 204, 220, 250, 260 |
| 8 | | 194 | 226 | 0.68 | 204, 230, 250 |
| 9 | | 187 | 217 | 0.69 | 205, 230 |
| 10 | 7.61 | 184 | 214 | 0.76 | 220, 230 |
| 11 | 6.42 | 204 | 243 | 1.01 | 204, 230, 250 |
| 12 | | 184 | 220 | 1.04 | 204, 218, 250 |
| 13 | | 181 | 228 | 1.38 | 230, 240 |
| 14 | 7.75 | 183 | 217 | 1.40 | 220, 230, 260 |
| 15 | 7.37 | 197 | 230 | 1.70 | 204, 250 |
| 16 | | 192 | 225 | 1.93 | 230, 260 |
| 17 | | 198 | 238 | 2.25 | 205, 250, 260 |
| 18 | 7.56 | 178 | 215 | 3.51 | 230, 260 |
| 19 | | 205 | 248 | 3.73 | 204, 250, 260 |

Example 21

A TFE/HFP copolymer prepared generally by the procedure of Example 1 and having HFPI=8.52, $T_m(peak)=165°$ C., $T_m(end)=203°$ C., and $MV=1.0\times10^3$ Pa.s was evaluated as a processing aid at $T_p=225°$ C. by the general procedure except that talc (ABT2500, Pfizer Minerals, Pfizer, Inc.) was sometimes used as antiblock agent instead of silica. Measurements were taken over a TFE/HFP copolymer resin concentration range of 100–1000 ppm, but in two instances operation at 1000 ppm was preceded by operation without antiblock at a TFE/HFP copolymer resin concentration of 10% for 5 minutes or 25 % for 3 minutes. When used as antiblock agent, talc concentration was 5000 ppm. Results in Table 7 show that the TFE/HFP copolymer is uniformly effective over a broad concentration range in the absence of antiblock and with talc as antiblock agent, and that it is less effective below 300 ppm with silica as antiblock agent. It was observed that the time to reach equilibrium extrusion conditions varies with TFE/HFP copolymer concentration. Equilibration was slow at 100 ppm. Equilibration rate at 300 ppm was intermediate and almost equal to the rate at 1000 ppm. Preliminary operation at 10% and at 25% resulted in much faster equilibration.

TABLE 7

Extrusion with Different TFE/HFP Resin Concentrations

| Conc. (ppm) | Antiblock | $\Delta p_1$ (%) | $\Delta p_2$ (%) |
|---|---|---|---|
| 100 | Silica | 53.5 | 26.2 |
| 200 | Silica | 54.9 | 37.5 |
| 200 | Talc | 54.5 | 52.7 |
| 300 | Silica | 54.5 | 45.3 |
| 1000 | Silica | 50.3 | 51.9 |
| 1000[a] | Talc | 52.5 | 53.8 |
| 1000[b] | Silica | 53.1 | 52.4 |

[a] 10% for 5 min without antiblock, then 1000 ppm.
[b] 25% for 3 min without antiblock, then 1000 ppm.

Comparative Example A

The extrusion evaluation procedure outlined in the introduction to the examples was followed using 1000 ppm of an elastomeric copolymer of vinylidene fluoride (VF2) and HFP made by the process of U.S. Pat. No. 2,968,649 as the fluoropolymer process aid. Molar composition of the elastomer was approximately VF$_2$/HFP=78/22 and glass transition temperature $T_g$ was about −23° C. This polymer is similar to that used by Blatz (U.S. Pat. No. 3,125,547) in several of his examples. Test temperature was 250° C. A single test temperature was employed because the elastomer has no crystalline melting point and all reasonable polyolefin processing temperatures are well above $T_g$. Test results were $\Delta p_1=33\%$ and $\Delta p_2=39\%$. Although the performance of this fluoropolymer did not suffer when antiblock was added, the level of performance was substantially below the better range of performance exhibited by the polymers of Example 20 shown in FIGS. 3 and 4.

Comparative Example B

Perfluorohexadecane, a low molecular weight TFE homopolymer with $T_m$(peak)=128° C. and $T_m$(end)=140° C., was evaluated as a processing aid at 1000 ppm at $T_p$=150° C. and 204° C. $\Delta p_1$ was 1.8% and 1.1%, respectively. These values are too low to be of interest, so measurement of $\Delta p_2$ was omitted. Based on $T_m$, this polymer is judged to be very similar to that tested by Blatz in his Example III.

Comparative Example C

To test the possibility that the fluoropolymer of Comparative Example B melted too far below normal $T_p$ for LLDPE to be effective, another low molecular weight TFE homopolymer with $T_m$(peak)=190° C. and $T_m$(end)=204° C. (perfluorotetracosane) was evaluated at 1000 ppm at $T_p$=185°, 204°, and 225° C. $\Delta p_1$=9.7%, 4.4%, and 1.2%, respectively. Measurement of $\Delta p_2$ was again omitted. Although this TFE homopolymer has $T_m$ comparable to some of the TFE/HFP copolymers of Example 20, it does not exhibit the outstanding performance of those copolymers for $T_p$ close to $T_m$.

The melt viscosities of the TFE homopolymers used in Comparative Examples B and C are much less than $0.1 \times 10^3$ Pa.s, i.e. the melt viscosities are so low as not to be measurable by the method used to measure the melt viscosities disclosed herein.

Example 22

A portion of the TFE/HFP copolymer resin identified as No. 19 in Table 6 was treated with fluorine gas as described above. Infrared analysis indicated that the combined concentration of carboxylic acid and acid fluoride end groups was reduced from 369/10$^6$ C atoms before fluorination to 40/10$^6$ C atoms by a single fluorine treatment and then to 20/10$^6$ C atoms by a second fluorine treatment. The original and fluorine-treated resins were tested at 260° C. by the extrusion procedure described in the introduction to the examples. Results summarized in Table 8 show that fluorine treatment does not impair the effectiveness of the fluoropolymers of this invention as processing aids, contrary to the teachings of U.S. Pat. No. 5,132,368 for the polymers studied therein.

TABLE 8

End Group Population and Processing Aid Performance

| Ends (ppm) | $\Delta p_1$ (%) | $\Delta p_2$ (%) |
|---|---|---|
| 369 | 60.6 | 48.6 |
| 40 | 62.7 | 62.8 |
| 20 | 65.4 | 63.9 |

Example 23

The TFE/HFP copolymer of Example 9, which had $T_m$(peak)=173° C., $T_m$(end)=204° C., and an acid end group population of 850/10$^6$ C atoms, was tested as a processing aid at 1000 ppm and $T_p$=204° C. by the procedure described in the introduction to the examples except that 5000 ppm of talc was used as antiblock agent. Under these conditions, $\Delta p_1=50.0\%$ and $\Delta p_2=50.8\%$. Various samples of this copolymer resin were treated with fluorine to reduce the population of carboxylic acid and acid fluoride ends to the range 49–244/10$^6$ C atoms. These treated samples were evaluated in the extrusion test at 60 rpm only, for which results had been found to approximate the average over the four screw speeds spanning the 30–120 rpm range. Results were tightly bunched in the ranges $\Delta p_1=47.6$–54.2% and $\Delta p_2=47.2$–53.4% and showed no systematic variation with functional end group population.

Comparative Example D

Four different perfluoroelastomers were evaluated as processing aids at a concentration of 200 ppm and at $T_p$=204° C. by the general procedure described above. The perfluoroelastomers were copolymers of TFE and PMVE with different curesite monomers prepared according to the patent references given in the following Table 9 along with test results.

TABLE 9

| Extrusion Results for Perfluoroelastomers | | | |
|---|---|---|---|
| Sample | U.S. Pat. No. | $\Delta p_1$ (%) | $\Delta p_2$ (%) |
| A | 3,467,638 | 36 | 3 |
| B | 4,035,565 | 46 | 33 |
| C | 4,281,092 | 29 | 4 |
| D | 4,529,784 | 28 | 29 |

These results show that non-crystalline perfluoropolymers do not exhibit the exceptional performance of the highly-fluorinated partially-crystalline copolymers of this invention.

Example 24

A partially crystalline TFE/PMVE copolymer was prepared in a shaker tube generally according to the procedures of U.S. Pat. No 3,132,123 with water as the polymerization medium and using 1,4-diiodoperfluorobutane as chain transfer agent. This polymer contained 33 wt % PMVE and had $T_m$(peak)=200° C., $T_m$(end)=225° C., and MV=6.5×x $10^3$ Pa.s by ASTM D-1218 at 250° C. When evaluated as a processing aid at 500 ppm and $T_p$=250° C., $\Delta p_1$=47%. $\Delta p_2$ was not measured. The value $\Delta p_1$=47% fits nicely on the plot in FIG. 3, indicating that this perfluorinated polymer functions much like TFE/HFP copolymers if melting and processing temperature relationships are the same. Furthermore, this result and the results of Comparative Example D taken together indicate that a fluoropolymer with very high fluorine content must also be partially crystalline to yield exceptional performance as a process aid.

Comparative Example E

A sample of TFE/HFP copolymer prepared generally by the method of U.S. Pat. No. 2,946,763 with HFPI=5.47, $T_m$(peak)=241° C., and $T_m$(end)=305° C. was tested as a processing aid. Copolymer powder concentration was 1000 ppm and $T_p$=225°, 250°, and 275° C. $\Delta p_1$=10%, 36%, and 42%, respectively. Antiblock was not tested at 225° C., but $\Delta p_2$=29% and 15%, respectively, for the other two temperatures. Placement of these data on FIGS. 3 & 4 suggests that the performance of this polymer may track the pattern discerned for the TFE/HFP copolymers of this invention, but that $T_p$ would have to be undesirably high to realize comparable performance. This copolymer is nominally the same as that used by Concannon in U.S. Pat. No. 4,075,362.

Example 25

A commercial TFE/HFP/VF$_2$ terpolymer (Hostaflon ® TFBX-7100, Hoechst) was tested as an extrusion processing aid by the evaluation procedure described in the introduction to the examples. For this test, concentration was 1000 ppm and $T_p$=180° and 225° C. Results were $\Delta p_1$=35.4 and 48.9% and $\Delta p_2$=30.8 and 44.6%, respectively. DSC analysis of the terpolymer yielded $T_m$(peak)=165° C. and $T_m$(end)=192° C., while NMR analysis showed composition to be about TFE/HFP/VF$_2$=51/16/32 by weight. This composition translates to a hydrogen content in the polymer of about 1 wt %. The result indicates that the surprisingly superior performance as a processing aid when $T_m$(end) is close to $T_p$ extends to highly-fluorinated partially-crystalline polymers that are not perfluorinated.

Example 26

A 1.5 wt % solution of the TFE/HFP copolymer of Example 8 in $C_{14}F_b$ 24 was used. A golf ball injection molding mold was heated to approximately 204° C. in an air oven and then removed from the oven. While still warm, the mold surfaces that contact polymer were painted with the copolymer solution. The mold pieces were air cooled and were then placed in injection molding service, molding ionomer resin around insert cores. The mold was operated 5 days/week for approximately 12 weeks with an average mold cycle time of 70 sec or less without the need to renew the TFE/HFP copolymer coating for adequate release. In previous experience molding the same article under the same molding conditions but using a mold release lubricant, cycle time was longer and it was necessary to reapply the mold release lubricant every 15-30 cycles. It was not necessary to use the lubricant after the mold was coated with the TFE/HFP copolymer.

Example 27

The TFE/HFP copolymer of Example 8 was used to mold a plaque approximately 15 cm square and 1 mm thick. A brass frame of appropriate dimensions was placed on a piece of polyimide film (KAPTON®, DuPont Company). Copolymer powder (65 g) was placed in the square opening of the frame and was distributed uniformly. The filled frame was covered with another piece of polyimide film, and the assembly was placed between the platens of a laboratory press heated to 203° C. The press was closed to make slight contact with the assembly, held in that position for 5 min, then fully closed. After 5 min at 10,000 lb (4545 kg) load, the assembly was removed from the hot press and was immediately transferred to another press with water-cooled platens at 25° C. When cool, the polyimide film was stripped off the assembly and the plaque was removed from the frame. The plaque was visually colorless, clear, and free from haze except for a small region near one edge. Seventeen additional plaques molded by the same procedure were discerned to have no haze by inspection with the unaided eye.

Example 28

This example illustrates the inclusion of perfluoro(alkyl vinyl) ether (PAVE) in TFE/HFP copolymer. The procedure of Example 1 was followed except that the demineralized water precharge was 50.7 parts, 0.076 part of Zonyl ® TBS surfactant was used, the reaction temperature was 108° C., HFP was added until pressure was 550 psig (3.8 MPa), 0.084 part of perfluoro(propyl vinyl) ether (PPVE) was charged after HFP addition, the first initiator addition was 0.66 part of solution containing both 0.45 wt % APS and 0.62 wt % KPS pumped at 0.066 part/min, PPVE was pumped into the reactor at 0.00034 part/min starting after polymerization had begun and continuing to the end of the batch (250 min), agitator speed was essentially constant at 40 rpm, and total TFE added to the reactor after initial pressurization was 14.2 parts. Total PPVE, precharged and pumped, added to the reactor was 0.17 part. The copolymer resin had an MV of 3.3×$10^3$ Pa.s, an HFPI of 6.96, a $T_m$(peak) of 185° C., and a $T_m$(end) of 227° C. High temperature $^{19}F$ NMR analysis indicated that the copolymer contained 22.6 wt % HFP and 0.32 wt % PPVE.

Example 29

This example illustrates the inclusion of perfluoroalkyl ethylene in TFE/HFP copolymer. The procedure of Example 1 was repeated, except that the amount of Zonyl® TBS surfactant was 0.054 part, 0.048 part of perfluorobutyl ethylene (PFBE) were charged to the polykettle after evacuation, and the 0.93 wt % APS solution was added at 0.020 part/min during polymerization. In this instance, the reaction time after initial pressurization was 277 min for the same total amount of TFE added to the reactor. The copolymer resin had an MV of $0.6 \times 10^3$ Pa.s, an HFPI of 6.78, a $T_m$(peak) of 196° C., and a $T_m$(end) of 227° C.

Example 30

This example illustrates the inclusion of hydroxy-functional fluorovinyl ether in TFE/HFP copolymer. The procedure of Example 2 was followed, except that 0.065 part of Zonyl® TBS surfactant was used, 0.033 part of $CF_2=CF-[OCF_2CF(CF_3)]-O-(CF_2)_2-CH_2-OH$ (EVE—OH, U.S. Pat. No. 4,982,009) were added to the reactor after evacuation, the first initiator addition was 0.44 part of solution containing both 1.20 wt % APS and 1.80 wt % KPS, and the initiator pumped during reaction contained both 0.23 wt % APS and 0.40 wt % KPS. The observed pressure drop during the 20-min initiator addition period was 46 psig (0.32 MPa), and the resultant dispersion discharged from the reactor had 24.2 wt % solids. The copolymer resin had an MV of $0.8 \times 10^3$ Pa.s, an HFPI of 7.38, a $T_m$(peak) of 188° C., and a $T_m$(end) of 234° C.

Example 31

This example also illustrates the inclusion of PAVE in TFE/HFP copolymer. A cyclindrical, horizontally disposed, water-jacketed, paddle-stirred, stainless steel reactor having a length to diameter ratio of 1.5 and a water capacity of 8.37 parts by weight was charged with 4.63 parts of demineralized water. The reactor was heated to 65° C., evacuated, purged with TFE, and evacuated again. The vacuum in the reactor was then used to draw in a solution of 0.008 part of Zonyl® TBS surfactant in water (0.19 part). The solution was rinsed into the reactor with another 0.13 parts of water. The reactor was then sealed and 0.016 parts of perfluoro(methyl vinyl) ether (PMVE) were pumped into the reactor. Agitation was begun at 100 rpm and the reactor temperature was raised to 103° C. With the reactor temperature controlled at 103° C., HFP was added slowly to the reactor to achieve a pressure of 522 psig (3.6 MPa). Then TFE was added to the reactor to achieve a final pressure of 600 psig (4.1 MPa). A freshly prepared aqueous solution (0.066 part) of 1.4 wt % APS was then pumped into the reactor at 0.011 part/min. This was followed by a solution of 1.0 wt % APS which was pumped into the reactor at 0.002 part/min for the remainder of the polymerization. After reaction had commenced ("kickoff") as indicated by a 10 psig (0.07 MPa) drop in reactor pressure, additional PMVE was pumped into the reactor at 0.0005 part/min and additional TFE was added as needed to maintain a reactor pressure of 4.1 MPa. The agitator speed was held constant at 100 rpm for the entire polymerization. Total TFE added after the initial pressureup was 1.4 parts. The TFE feed was then stopped and full cooling was applied to the reactor. The time from polymerization kickoff until TFE feed was stopped was 273 min. When the reactor contents reached 90° C, the agitator was stopped and the reactor was vented. Venting required about 10 minutes and then the initiator flow was stopped. After venting to nearly atmospheric pressure, the reactor was purged with nitrogen to remove residual monomer. The dispersion was then discharged from the reactor and coagulated by vigorous stirring to obtain a copolymer powder which was dried in a vacuum oven at 100° C. before being characterized. The resin had an MV of $0.3 \times 10^3$ Pa.s, an HFPI of 6.47, a $T_m$(peak) of 163° C., and a $T_m$(end) of 198° C. The amount of PMVE in the TFE/HFP copolymer was 6.3 wt % based on analysis of an infrared absorbance at 889 $cm^{-1}$ attributed to PMVE in the copolymer. An identical polymerization was carried out except that the PMVE was not added to the polymerization. The product of that polymerization had an MV of $0.1 \times 10^3$ Pa.s, an HFPI of 7.36, a $T_m$(peak) of 181° C, and a $T_m$(end) of 230° C. Infrared analysis of this copolymer resin showed no absorbance peak at 889 $cm^{-1}$.

What is claimed is:

1. A solution of partially crystalline copolymer of tetrafluoroethylene (TFE) and hexafluoropropylene (HFP) having a hexafluoropropylene index (HFPI) in the range 6.4 to about 9 in a highly fluorinated cycloalkane or aromatic solvent, having a copolymer concentration up to about 30 wt %.

2. The solution of claim 1 wherein the copolymer has a viscosity (MV) of from about $0.1 \times 10^3$ to about $10 \times 10^3$ Pa.s.

3. The solution of claim 1 wherein the solvent is a perfluorinated cycloalkane.

4. The solution of claim 3, wherein the solvent is perfluorodecalin or perfluoro(tetradecahydrophenanthrene).

5. The solution of claim 1 wherein the copolymer concentration is from about 0.1 to about 10 wt %.

6. The solution of claim 1 wherein the solvent is perfluoro(tetradecahydrophenanthrene) and the copolymer concentration is from about 0.5 to about 5 wt %.

7. A fluid, stable copolymer/solvent system wherein the copolymer is partially crystalline copolymer of tetrafluoroethylene (TFE) and hexafluoropropylene (HFP) having a hexafluoropropylene index (HFPI) in the range 6.4 to about 9, the solvent is a highly-fluorinated cycloalkane or aromatic compound, and the copolymer concentration is from about 0.1 to about 10 wt %.

8. The copolymer/solvent system of claim 7 wherein the solvent is perfluorodecalin or perfluoro(tetradecahydrophenanthrene) and the copolymer concentration is from about 0.5 to about 5 wt %.

9. The copolymer/solvent system of claim 7 wherein the solvent is perfluorodecalin or perfluoro(tetradecahydrophenanthrene) and the copolymer concentration is from about 0.5 to about 2.5 wt %.

10. The copolymer/solvent system of claim 7 wherein the solvent is perfluoro(tetradecahydrophenanthrene).

11. A suspension of partially crystalline copolymer of tetrafluoroethylene (TFE) and hexafluoropropylene (HFP) having a hexafluoropropylene index (HFPI) in the range 6.4 to about 9 in a highly-fluorinated cycloalkane or aromatic solvent, having a copolymer concentration of at least 0.1 wt %.

12. The suspension of claim 11 wherein the copolymer concentration is from about 0.5 to about 5 wt %.

13. The suspension of claim 12 wherein the solvent is predominantly perfluoro(triamylamine).

14. A gel comprising a highly-fluorinated cycloalkane or aromatic solvent and partially crystalline copolymer of tetrafluoroethylene (TFE) and hexafluoropropylene (HFP) having a hexafluoropropylene index (HFPI) in the range 6.4 to about 9.

15. The gel of claim 14 wherein the solvent is a perfluorinated cycloalkane.

* * * * *